United States Patent
Rebeiz et al.

(10) Patent No.: US 10,135,593 B2
(45) Date of Patent: Nov. 20, 2018

(54) ALLOCATION SIGNALING FOR WIRELESS COMMUNICATION NETWORKS

(71) Applicant: QUALCOMM Incorporated, San Diego, CA (US)

(72) Inventors: Eric Pierre Rebeiz, San Diego, CA (US); Rahul Tandra, San Diego, CA (US); Arjun Bharadwaj, San Diego, CA (US); Sameer Vermani, San Diego, CA (US); Bin Tian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 75 days.

(21) Appl. No.: 14/975,188

(22) Filed: Dec. 18, 2015

(65) Prior Publication Data

US 2016/0183224 A1    Jun. 23, 2016

Related U.S. Application Data

(60) Provisional application No. 62/096,427, filed on Dec. 23, 2014.

(51) Int. Cl.
*H04L 5/00* (2006.01)
*H04W 72/12* (2009.01)

(52) U.S. Cl.
CPC .......... *H04L 5/0053* (2013.01); *H04L 5/0092* (2013.01); *H04W 72/1263* (2013.01); *H04L 5/0094* (2013.01); *H04W 72/1289* (2013.01)

(58) Field of Classification Search
CPC .......... H04W 72/042; H04W 72/1263; H04W 72/0453; H04W 72/1289; H04L 5/0053; H04L 5/0092; H04L 5/0094
See application file for complete search history.

(56) References Cited

U.S. PATENT DOCUMENTS

| | | | |
|---|---|---|---|
| 2004/0082356 A1* | 4/2004 | Walton | H04B 7/022 455/522 |
| 2014/0307612 A1 | 10/2014 | Vermani et al. | |
| 2015/0131517 A1* | 5/2015 | Chu | H04W 72/005 370/312 |
| 2016/0227572 A1* | 8/2016 | Li | H04W 72/1289 |

(Continued)

OTHER PUBLICATIONS

International Search Report and Written Opinion—PCT/US2015/067124—ISA/EPO—dated Mar. 24, 2016.

(Continued)

*Primary Examiner* — Kwang B Yao
*Assistant Examiner* — Moo Jeong
(74) *Attorney, Agent, or Firm* — Steven R. Thiel; Knobbe, Martens, Olson & Bear, LLP

(57) ABSTRACT

Methods and apparatuses for communicating over a wireless communication network are disclosed herein. One method includes selecting one of a plurality of allocation schemas for allocation of wireless resources to wireless communication devices. The method further includes generating an allocation message comprising an identifier of the selected allocation schema and one or more allocations of wireless resources according to selected allocation schema. The method further includes transmitting the allocation message to one or more wireless communication devices.

26 Claims, 17 Drawing Sheets

(56) References Cited

U.S. PATENT DOCUMENTS

2016/0242195 A1\* 8/2016 Kwon ................. H04W 72/121
2017/0063588 A1\* 3/2017 Sun ....................... H04L 5/0025

OTHER PUBLICATIONS

Ward L., "802.11ac Technology Introduction White Paper", Rhode and Schwarz, Mar. 1, 2012 (Mar. 1, 2012), XP055084958, Retrieved from the Internet: URL:http://cdn.rohde-schwarz.com/dl_downloads/dl_application/application_notes/1ma192/1MA192_7e_80211ac_technology.pdf [retrieved on Oct. 22, 2013], the whole document, \* cited by examiner

| Bandwidth | 20MHz | | 40MHz | | | 80MHz | | |
|---|---|---|---|---|---|---|---|---|
| FFT Size | 256 | | 512 | | | 1024 | | |
| # of TAUs x Tones/TAU | 9x26 | 1x242 | 19x26 | 18x26 | 2x242 | 38x26 | 36x26 | 4x242 |
| # of tones for allocation | 234 | 242 | 494 | 468 | 484 | 988 | 936 | 968 |
| # of DC+guard+leftover | 22 | 14 | 18 | 44 | 28 | 36 | 88 | 56 |

FIG. 4

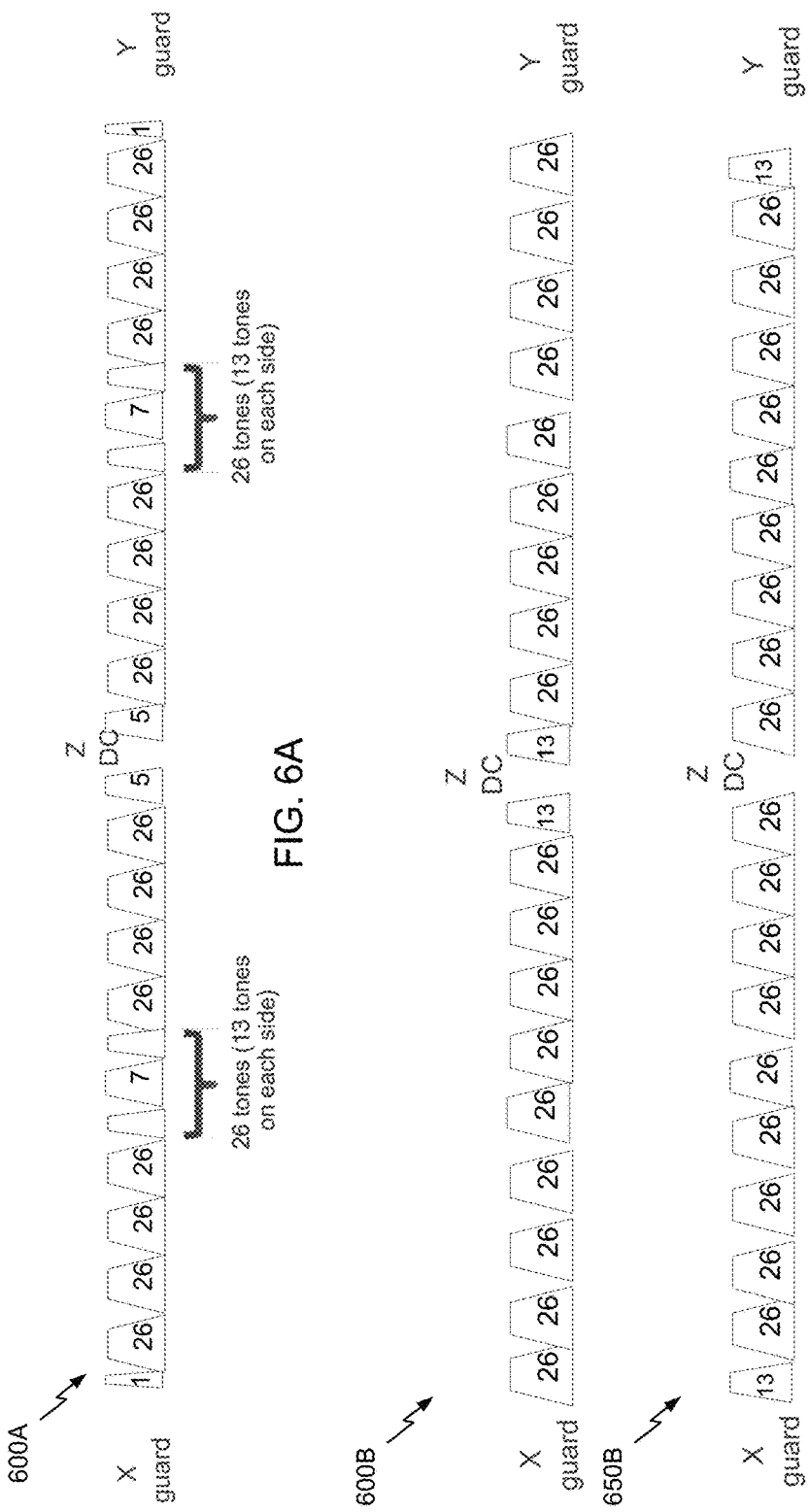

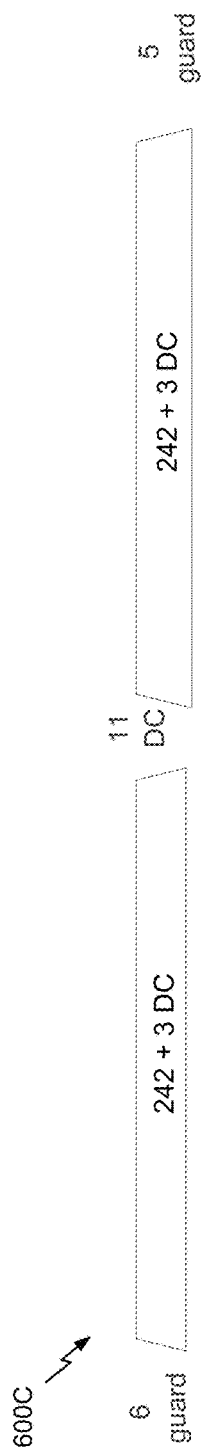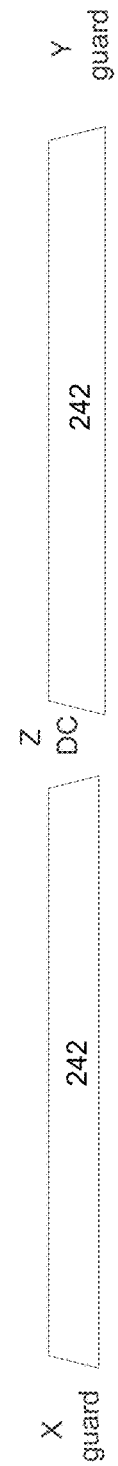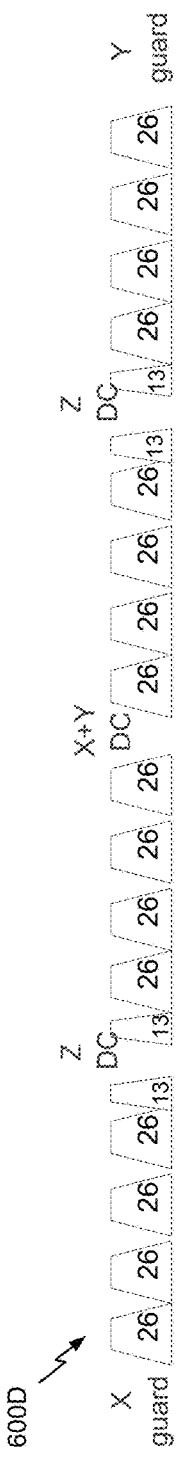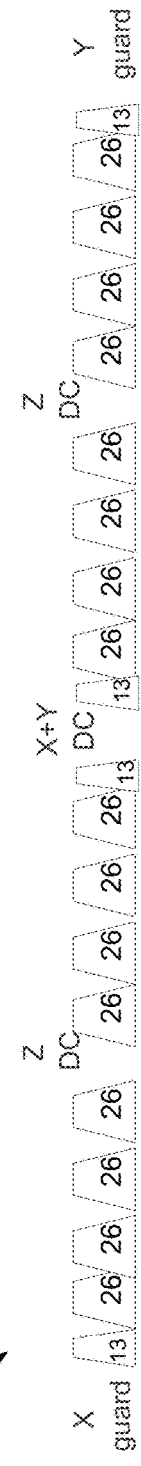
FIG. 6C
FIG. 6D

| Allocation Index | Allocation Type | # Allocations |
|---|---|---|
| 00 | 9x[1x26] | 9 |
| 01 | 4x[2x26], 1x[1x26] | 5 |
| 10 | 3x[3x26] | 3 |
| 11 | 1x[4x26], 1x[5x26] | 2 |

| Allocation Index | Allocations Type | # Allocations |
|---|---|---|
| 00 | 9x[2x26], 1x[1x26] | 10 |
| 01 | 1x[1x242], 9x[1x26] | 10 |
| 10 | 1x[1x242], 4x[2x26], 1x[1x26] | 6 |
| 11 | 2x[1x242] | 2 |

FIG. 8D

| Allocation Index | Allocations Type | # Allocations |
|---|---|---|
| 00 | 9x[4x26],1x[2x26] | 10 |
| 01 | 1x[1x242], 7x[4x26] | 8 |
| 10 | 2x[1x242], 4x[4x26], 1x[3x26] | 7 |
| 11 | 4x[1x242] | 4 |

FIG. 8F

ALLOCATION SIGNALING FOR WIRELESS COMMUNICATION NETWORKS

PRIORITY CLAIM

This application claims priority under 35 U.S.C. § 119(e) to U.S. Provisional App. No. 62/096,427, filed Dec. 23, 2014, which is incorporated by reference herein in its entirety.

FIELD

Certain aspects of the present disclosure generally relate to wireless communications, and more particularly, to methods and apparatuses for signaling allocations according to various allocation schemas.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a method of communicating over a wireless communication network. The method includes selecting one of a plurality of allocation schemas for allocation of wireless resources to wireless communication devices. The method further includes generating an allocation message including an identifier of the selected allocation schema and one or more allocations of wireless resources according to selected allocation schema. The method further includes transmitting the allocation message to one or more wireless communication devices.

In various embodiments, each of the one or more allocations corresponds to a corresponding ordinal allocation in the selected allocation schema. In various embodiments, the plurality of allocation schemas can include allocations of one or more 26-tone and 242-tone blocks.

In various embodiments, the plurality of allocation schemas can include 20 MHz schemas, 40 MHz schemas, and 80 MHz schemas, wherein at least one 40 MHz schema can include a portion of a 20 MHz schema, wherein at least one 80 MHz scheme can include a portion of a 20 MHz schema or a 40 MHz schema. In various embodiments, the allocation message can include a two-bit bandwidth indication and a four-bit schema identifier.

In various embodiments, the allocations each can include an indication indicating whether or not more than one user shares the allocation. In various embodiments, the allocation can include an indication of the number of users sharing the allocation, a station identifier for each user sharing the allocation, and one or more user parameters for each user sharing the allocation. In various embodiments, no more than 8 users share each allocation and the indication of the number of users sharing the allocation can include three bits.

In various embodiments, when the indication indicates that more than one user does not share the allocation, the allocation can include a station identifier and one or more user parameters. In various embodiments, method can be performed by an access point serving at least one mobile station. A processor of the access point can be configured to transmit the allocation message to the at least one mobile station through a transmitter and antenna of the access point. In various embodiments, transmitting the allocation message can include transmitting at least a portion of the allocation message using a 1× symbol duration of 3.2 ms or a 4× symbol duration of 12.8 ms.

Another aspect provides an apparatus configured to provide wireless communication. The apparatus includes a memory that stores instructions. The apparatus further includes a processor coupled with the memory. The processor and the memory are configured to select one of a plurality of allocation schemas for allocation of wireless resources to wireless communication devices. The processor and the memory are further configured to generate an allocation message including an identifier of the selected allocation schema and one or more allocations of wireless resources according to selected allocation schema. The apparatus further includes a transmitter configured to transmit the allocation message to one or more wireless communication devices.

In various embodiments, each of the one or more allocations corresponds to a corresponding ordinal allocation in the selected allocation schema. In various embodiments, the plurality of allocation schemas can include allocations of one or more 26-tone and 242-tone blocks.

In various embodiments, the plurality of allocation schemas can include 20 MHz schemas, 40 MHz schemas, and 80 MHz schemas, wherein at least one 40 MHz schema can include a portion of a 20 MHz schema, wherein at least one 80 MHz scheme can include a portion of a 20 MHz schema or a 40 MHz schema. In various embodiments, the allocation message can include a two-bit bandwidth indication and a four-bit schema identifier.

In various embodiments, the allocations each can include an indication indicating whether or not more than one user shares the allocation. In various embodiments, the allocation can include an indication of the number of users sharing the allocation, a station identifier for each user sharing the allocation, and one or more user parameters for each user sharing the allocation. In various embodiments, no more than 8 users share each allocation and the indication of the number of users sharing the allocation can include three bits.

In various embodiments, when the indication indicates that more than one user does not share the allocation, the allocation can include a station identifier and one or more user parameters. In various embodiments, the apparatus includes an access point serving at least one mobile station. The processor and memory can be configured to transmit the allocation message to the at least one mobile station through the transmitter and an antenna of the access point. In various embodiments, the transmitter can be configured to transmit at least a portion of the allocation message using a 1× symbol duration of 3.2 ms or a 4× symbol duration of 12.8 ms.

Another aspect provides another apparatus for wireless communication. The apparatus includes means for selecting one of a plurality of allocation schemas for allocation of wireless resources to wireless communication devices. The apparatus further includes means for generating an allocation message including an identifier of the selected allocation schema and one or more allocations of wireless resources according to selected allocation schema. The apparatus further includes means for transmitting the allocation message to one or more wireless communication devices.

In various embodiments, each of the one or more allocations corresponds to a corresponding ordinal allocation in the selected allocation schema. In various embodiments, the plurality of allocation schemas can include allocations of one or more 26-tone and 242-tone blocks.

In various embodiments, the plurality of allocation schemas can include 20 MHz schemas, 40 MHz schemas, and 80 MHz schemas, wherein at least one 40 MHz schema can include a portion of a 20 MHz schema, wherein at least one 80 MHz scheme can include a portion of a 20 MHz schema or a 40 MHz schema. In various embodiments, the allocation message can include a two-bit bandwidth indication and a four-bit schema identifier.

In various embodiments, the allocations each can include an indication indicating whether or not more than one user shares the allocation. In various embodiments, the allocation can include an indication of the number of users sharing the allocation, a station identifier for each user sharing the allocation, and one or more user parameters for each user sharing the allocation. In various embodiments, no more than 8 users share each allocation and the indication of the number of users sharing the allocation can include three bits.

In various embodiments, when the indication indicates that more than one user does not share the allocation, the allocation can include a station identifier and one or more user parameters. In various embodiments, the apparatus can include an access point serving at least one mobile station. A processor of the access point can be configured to transmit the allocation message to the at least one mobile station through a transmitter and antenna of the access point. In various embodiments, the means for transmitting can be configured to transmit at least a portion of the allocation message using a 1× symbol duration of 3.2 ms or a 4× symbol duration of 12.8 ms.

Another aspect provides a non-transitory computer-readable medium. The medium includes code that, when executed, causes an apparatus to select one of a plurality of allocation schemas for allocation of wireless resources to wireless communication devices. The medium further includes code that, when executed, causes the apparatus to generate an allocation message including an identifier of the selected allocation schema and one or more allocations of wireless resources according to selected allocation schema. The medium further includes code that, when executed, causes the apparatus to transmit the allocation message to one or more wireless communication devices.

In various embodiments, each of the one or more allocations corresponds to a corresponding ordinal allocation in the selected allocation schema. In various embodiments, the plurality of allocation schemas can include allocations of one or more 26-tone and 242-tone blocks.

In various embodiments, the plurality of allocation schemas can include 20 MHz schemas, 40 MHz schemas, and 80 MHz schemas, wherein at least one 40 MHz schema can include a portion of a 20 MHz schema, wherein at least one 80 MHz scheme can include a portion of a 20 MHz schema or a 40 MHz schema. In various embodiments, the allocation message can include a two-bit bandwidth indication and a four-bit schema identifier.

In various embodiments, the allocations each can include an indication indicating whether or not more than one user shares the allocation. In various embodiments, the allocation can include an indication of the number of users sharing the allocation, a station identifier for each user sharing the allocation, and one or more user parameters for each user sharing the allocation. In various embodiments, no more than 8 users share each allocation and the indication of the number of users sharing the allocation can include three bits.

In various embodiments, when the indication indicates that more than one user does not share the allocation, the allocation can include a station identifier and one or more user parameters. In various embodiments, the apparatus can include an access point serving at least one mobile station. A processor of the access point can be configured to transmit the allocation message to the at least one mobile station through a transmitter and antenna of the access point. In various embodiments, the apparatus can be configured to transmit at least a portion of the allocation message using a 1× symbol duration of 3.2 ms or a 4× symbol duration of 12.8 ms.

BRIEF DESCRIPTION OF THE DRAWINGS

FIG. 4 is an illustration of a 20 MHz, a 40 MHz, and an 80 MHz transmission.

FIGS. 6A-6D illustrate 40 MHz transmissions according to various implementations.

FIG. 8D shows example allocation indexes for the allocation types of FIG. 8C.

FIG. 8F shows example allocation indexes for the allocation types of FIG. 8E.

DETAILED DESCRIPTION

Figure 1:
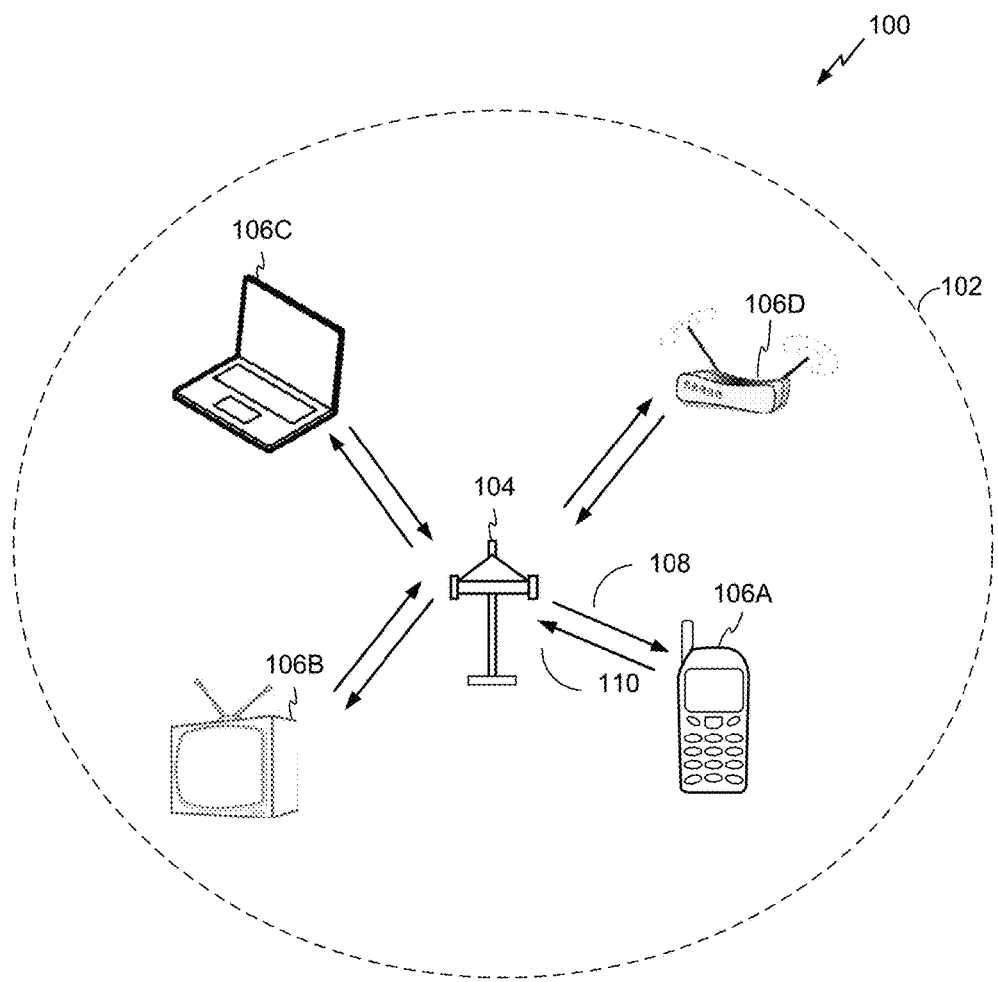
FIG. 1 illustrates an example of a wireless communication system in which aspects of the present disclosure can be employed.

Various aspects of the novel systems, apparatuses, and methods are described more fully hereinafter with reference to the accompanying drawings. The teachings of this disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemas.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing schema. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
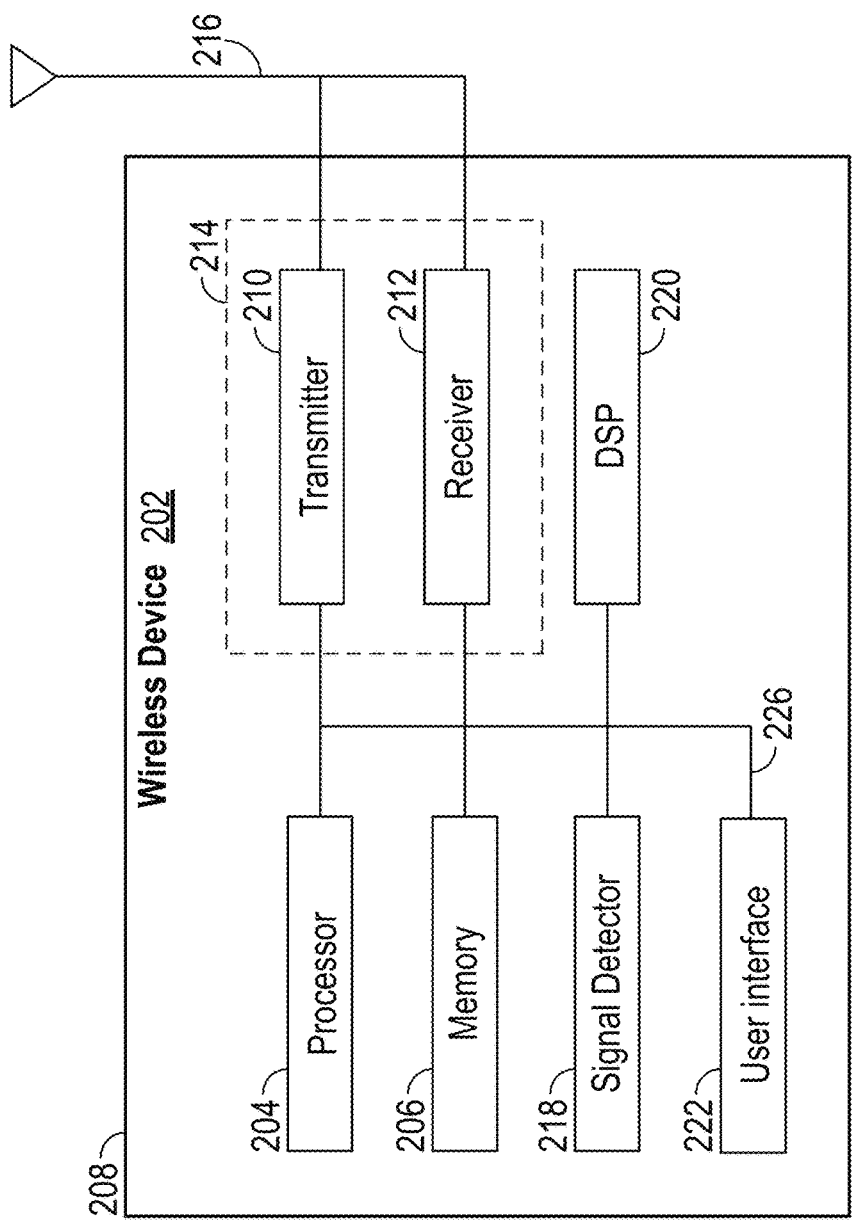
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 3.2 ms and a 4× symbol duration can be 12.8 ms. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Efficient Tone Plan Design for Multicarrier Allocation

Figure 3:
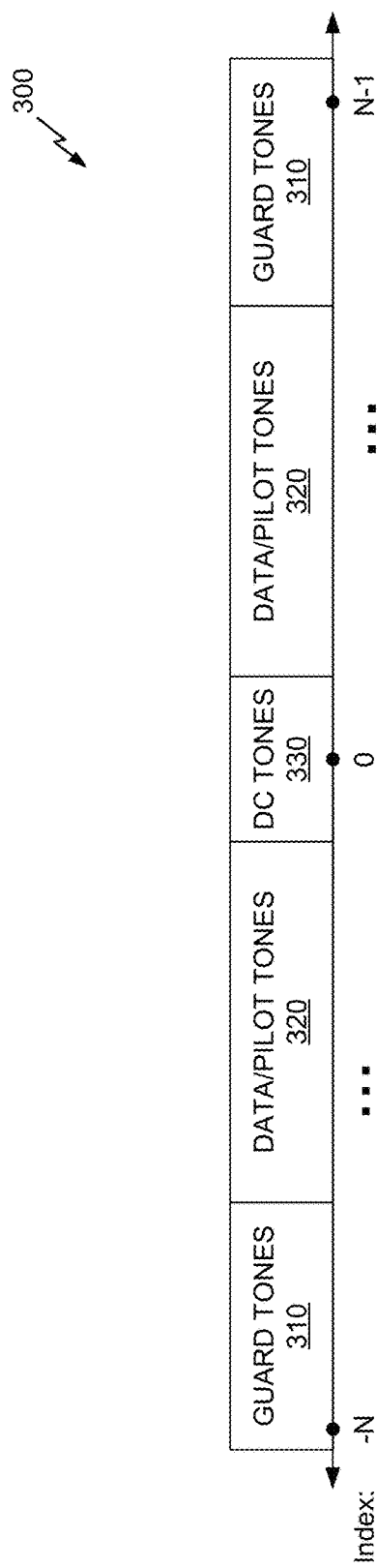
FIG. 3 shows an example 2N-tone plan, according to one embodiment.

FIG. 3 shows an example 2N-tone plan 300, according to one embodiment. In an embodiment, the tone plan 300 corresponds to OFDM tones, in the frequency domain, generated using a 2N-point FFT. The tone plan 300 includes 2N OFDM tones indexed −N to N-1. The tone plan 300 includes two sets of edge tones 310, two sets of data/pilot tones 320, and a set of direct current (DC) tones 330. In various embodiments, the edge tones 310 and DC tones 330 can be null. In various embodiments, the tone plan 300 includes another suitable number of pilot tones and/or includes pilot tones at other suitable tone locations.

In some aspects, OFDMA tone plans may be provided for transmission using a 4× symbol duration, as compared to various IEEE 802.11 protocols. For example, 4× symbol duration may use a number of symbols which are each 12.8 ms in duration (whereas symbols in certain other IEEE 802.11 protocols may be 3.2 ms in duration).

In some aspects, the data/pilot tones 320 of a transmission 300 may be divided among any number of different users. For example, the data/pilot tones 320 may be divided among between one and eight users. In order to divide the data/pilot tones 320, an AP 104 or another device may signal to the various devices, indicating which devices may transmit or receive on which tones (of the data/pilot tones 320) in a particular transmission. Accordingly, systems and methods for dividing the data/pilot tones 320 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, or 80 MHz, and it may be desirable to use a tone plan that can be used for any of these bandwidths. Further, a tone plan may be simple in that it uses a smaller number of building block sizes. For example, a tone plan may contain a unit which may be referred to as a tone allocation unit (TAU). This unit may be used to assign a particular amount of bandwidth to a particular user. For example, one user may be assigned bandwidth as a number of TAUs, and the data/pilot tones 320 of a transmission may be broken up into a number of TAUs. In some aspects, it may be beneficial to have a single size of TAU. For example, if there were two or more sizes of TAU, it may require more signaling to inform a device of the tones that are allocated to that device. In contrast, if all tones are broken up into TAUs of consistent size, signaling to a device may simply require telling a device a number of TAUs assigned to that device. Accordingly, using a single TAU size may reduce signaling and simplify tone allocation to various devices.

A tone plan may also be chosen based on efficiency. For example, transmissions of different bandwidths (e.g., 20, 40, or 80 MHz) may have different numbers of tones. Thus, it may be beneficial to choose a TAU size that leaves fewer tones leftover after the creation of the TAUs. For example, if a TAU was 100 tones, and if a certain transmission included 199 tones, this may leave 99 tones leftover after creating one TAU. Thus, 99 tones may be considered "leftover" tones, and this may be quite inefficient. Accordingly, reducing the number of leftover tones may be beneficial. It may also be beneficial if a tone plan is used which allows for the same tone plan to be used in both UL and DL OFDMA transmissions. Further, it may be beneficial if a tone plan is configured to preserve 20 and 40 MHz boundaries, when needed. For example, it may be desirable to have a tone plan which allows each 20 or 40 MHz portion to be decoded separately from each other, rather than having allocations which are on the boundary between two different 20 or 40 MHz portions of the bandwidth. For example, it may be beneficial for interference patterns to be aligned with 20 or 40 MHz channels. Further, it may be beneficial to have channel binding, such that when a 20 MHz transmission and a 40 MHz transmission are transmitted, to create a 20 MHz "hole" in the transmission when transmitted over 80 MHz. This may allow, for example, a legacy packet to be transmitted in this unused portion of the bandwidth. Finally, it may also be advantageous to use a tone plan which provides for fixed pilot tone locations in various different transmissions, such as in different bandwidths.

Generally, a number of different implementations are presented. For example, certain implementations have been made which include multiple different building blocks, such as two or more different tone units. For example, there may be a basic tone unit (BTU), and a small tone unit (STU), which is smaller than the basic tone unit. Further, the size of the BTU itself may vary based upon the bandwidth of the transmission. In another implementation, resource blocks are used, rather than tone units. However, in some aspects, it may be beneficial to use a single tone allocation unit TAU for all bandwidths of transmissions in OFDMA.

FIG. 4 is an illustration of a 20 MHz, a 40 MHz, and an 80 MHz transmission. As shown in FIG. 4, each transmission can be formed from a combination of one or more 26-tone TAUs, or one or more 242-tone TAUs. Generally, 26 tones in an IEEE 802.11ax transmission may be transmitted over a bandwidth of 2.03 MHz and 242 tones can be transmitted over a bandwidth of 18.91 MHz. For example, in one implementation, a 20 MHz transmission, having an FFT size of 256, can include 234 allocation tones formed from nine 26-tone TAUs, leaving 22 remaining tones for DC tones, edge tones, and other leftover tones. The 234 allocation tones can be used as data and pilot tones. In another implementation, a 20 MHz transmission, having an FFT size of 256, can include 242 allocation tones formed from one 242-tone TAU, leaving 14 remaining tones for DC tones, edge tones, and other leftover tones. The 242 allocation tones can be used as data and pilot tones.

As another example, in one implementation, a 40 MHz transmission, having an FFT size of 512, can include 494 allocation tones formed from 19 26-tone TAUs, leaving 18 remaining tones for DC tones, edge tones, and other leftover tones. The 494 allocation tones can be used as data and pilot tones. In another implementation, a 40 MHz transmission, having an FFT size of 512, can include 468 allocation tones formed from 18 26-tone TAUs, leaving 44 remaining tones for DC tones, edge tones, and other leftover tones. The 468 allocation tones can be used as data and pilot tones. In another implementation, a 40 MHz transmission, having an FFT size of 512, can include 484 allocation tones formed from two 242-tone TAUs, leaving 28 remaining tones for DC tones, edge tones, and other leftover tones. The 484 allocation tones can be used as data and pilot tones.

As another example, in one implementation, an 80 MHz transmission, having an FFT size of 1024, can include 988 allocation tones formed from 38 26-tone TAUs, leaving 36 remaining tones for DC tones, edge tones, and other leftover tones. The 988 allocation tones can be used as data and pilot tones. In another implementation, an 80 MHz transmission, having an FFT size of 1024, can include 936 allocation tones formed from 36 26-tone TAUs, leaving 88 remaining tones for DC tones, edge tones, and other leftover tones. The 936 allocation tones can be used as data and pilot tones. In another implementation, an 80 MHz transmission, having an FFT size of 1024, can include 968 allocation tones formed from four 242-tone TAUs, leaving 56 remaining tones for DC tones, edge tones, and other leftover tones. The 968 allocation tones can be used as data and pilot tones.

In various embodiments, the location of the 9th 26 tone block for 20 MHz implementations and the 19th 26-tone block for 40 MHz implementations, can either cross DC or at the edges. In one embodiment, the last 26-tone block can be distributed around DC when the number of DC+leftover tones is greater than 6. In another embodiment, the last 26-tone block can be distributed at the edges when the number guards tones+leftover tones is greater than 12 20 MHz implementations and greater than 18 for 40 MHz implementations. In an embodiment, the allowed allocation unit size can be limited to reduce the Tx mode. In an embodiment, the 19th 26-tone RU in 40 MHz can go unused if the allocation unit is 2×26. In an embodiment, the 37th and 38th 26-tone blocks in 80 MHz implementations can go unused if the allocation unit is 4×26. In some embodiments, 26-tone blocks can be aligned with 242 tone blocks via leftover tones, as will be discussed with respect to FIG. 8. In various embodiments, 242 allocations will not destroy nearby 26-tone block usage. In various embodiments, leftover tones can be used as extra DC tones, guard tones, or as a common or control channel.

As indicated above, a number of tones may be leftover in certain transmissions. These tones can be used for a number of different uses. For example, these tones may be used as additional DC or edge tones. It may be noted here that some illustrated implementations include transmissions having an odd number of TAUs. Because of the odd number of TAUs, one of the TAUs will cross the DC tones (that is, include tones on each side of the DC tones). In other illustrated implementations, an even number of TAUs are present, so no TAU will cross the DC tones.

In some aspects, if a STA is assigned multiple TAUs, encoding may be performed across all the assigned TAUs. For sub-band OFDMA communications, interleaving may be done in two layers. First, all the bits of a device may be distributed evenly across all TAUs assigned to the device. For example, bits 1, 2, 3, . . . N may be assigned to TAUs 1, 2, 3, . . . N, and so on. Accordingly, each individual TAU may be interleaved within the TAU. Thus, only one size of interleaver may be used, that is, the size of a TAU. In a distributed OFDMA system, interleaving may or may not be needed. In some aspects, a TAU may be chosen, at least in part, based on how many pilot tones may be needed for the TAU. For example, a TAU of 26 may be beneficial in implementations where only two pilot tones per TAU are used. In implementations where more pilot tones are used, other TAUs may be used. Generally, when considering the size of a TAU, there is a trade-off between signaling costs, pilot costs, and leftover tones. For example, when smaller TAUs are used, the number of pilot tones needed (compared to the number of data tones) may increase as a proportion of the total number of tones in a TAU. Further, when smaller TAUs are used, signaling may require more data to transmit, since there will be a higher total number of TAUs which must be allocated to various devices in an OFDMA transmission. However, as larger TAUs are used, there are potentially more leftover tones, which may reduce overall throughput for a given bandwidth and be inefficient.

Figure 5A:
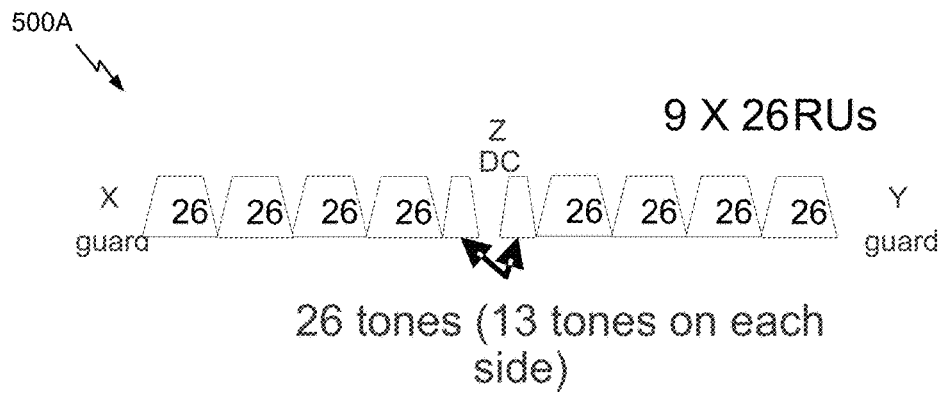
FIGS. 5A-5C illustrate 20 MHz transmissions according to various implementations.
Figure 5B:
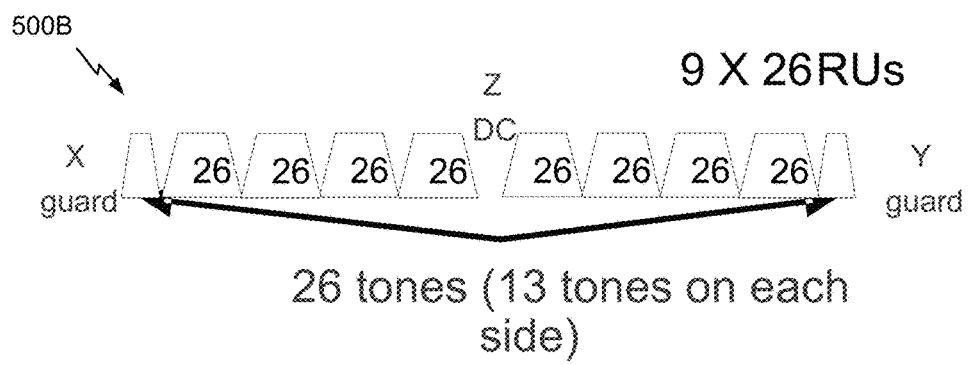
Figure 5C:
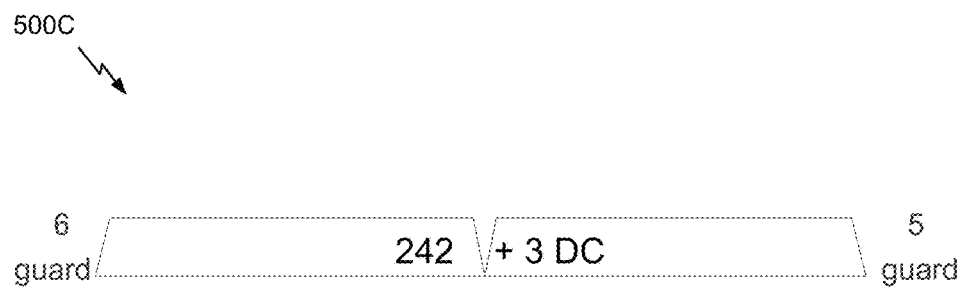

FIGS. 5A-5C illustrate 20 MHz transmissions according to various implementations. In particular, the illustrated 20 MHz transmissions show the embodiments discussed above with respect to FIG. 4. For implementations using 26-tone TAUs, each 20 MHz transmission includes a number of usable tones for OFDMA equal to floor((256−14)/26)*26=234. Accordingly, implementations using 26-tone TAUs have 8 additional leftover tones as compared to implementations having a single 242-tone TAU. In such implementations, the maximum number of DC and edge tones is 256−234=22. In general, each transmission of 26-tone TAUs can distribute these DC and edge tones as X left edge tones, Z DC tones, and Y right guard tones. In some embodiments, the number of right edge tones Y is one less than the number of left edge tones X. Moreover, in some embodiments, the number of DC tones Z is greater or equal to three, and an odd number. Thus, various implementations using 26-tone TAUs can use 11 DC tones and 11 edge tones, 9 DC tones and 13 edge tones, 7 DC tones and 15 edge tones, 5 DC tones and 17 edge tones, or 3 DC tones and 19 edge tones.

FIG. 5A is an illustration of an example 20 MHz transmission 500A using 26-tone allocations. This 20 MHz transmission includes 256 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −128 (on the left) to 127 (on the right). The DC tones may be in the center of the tones. In an embodiment, X+Y+Z=22, and Z is an odd integer greater than or equal to 3.

The transmission 500A may include four contiguous 26-tone allocations on the left side of the DC tones, and four contiguous 26-tone allocations on the right side of the DC tones. Further, the transmission 500A may include 13 additional data tones on each side of the DC tones. These 13 additional data tones on each side may be combined together, in order to form a 9th 26-tone allocation. Accordingly, the transmission 500A may include 9 26-tone allocations, each of which may include 24 data tones and 2 pilot tones.

In various embodiments, the 9th 26-tone allocation can be located on each side of the DC tones when the transmission 500A has more than 7 DC tones. In another embodiment, the 9th 26-tone allocation can be located at the edges of the transmission when the transmission has greater than 13 edge tones, as shown in FIG. 5B below.

FIG. 5B is an illustration of another example 20 MHz transmission 500B using 26-tone allocations. This 20 MHz transmission includes 256 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −128 (on the left) to 127 (on the right). The DC tones may be in the center of the tones.

The transmission 500B may include four contiguous 26-tone allocations on the left side of the DC tones, and four contiguous 26-tone allocations on the right side of the DC tones. Further, the transmission 500B may include 13 additional data tones on each side of the first eight 26-tone allocations. These 13 additional data tones on each side may be combined together, in order to form a 9th 26-tone allocation. Accordingly, the transmission 500B may include 9 26-tone allocations, each of which may include 24 data tones and 2 pilot tones.

In various embodiments, the 9th 26-tone allocation can be located at the edges of the transmission when the transmission 500B has more than 13 edge tones. In another embodiment, when the transmission has more than 7 DC tones, the 9th 26-tone allocation can be located on each side of the DC tones, as shown in FIG. 5A above.

FIG. 5C is an illustration of another example 20 MHz transmission 500C using a 242-tone allocation. As illustrated, a 20 MHz transmission may include a single 242-tone allocation plus 3 DC tones (in the center of the 20 MHz portion). In some aspects, this transmission may include 6 left edge tones and 5 right edge tones, as well as 3 DC tones.

In some embodiments, the 20 MHz transmission 500C can use a tone plan that is based on an IEEE 802.11ac VHT80 (Very High Throughput 80 MHz) transmission. Since this 20 MHz packet may include 4× symbol duration relative to 802.11ac, the packet may have the same number of tones as an 80 MHz transmission in 802.11ac. Thus, the 80 MHz transmission from 802.11ac may be used as a 20 MHz transmission here. One possible issue with this, however, is that such a transmission includes only 3 DC tones. This may be an insufficient number of DC tones for a 4× symbol duration transmission. In a 40 MHz transmission, a new tone plan may be used, or a two VHT80 transmissions (VHT80+80 or VHT160) may be used. For example, in 802.11ac, a 160 MHz transmission may be transmitted by using the 80 MHz VHT80 tone plan, duplicated twice. For an 80 MHz transmission, this may use a new tone plan, or may use a duplicated 40 MHz tone plan (that is, four VHT80 transmissions from IEEE 802.11ac). Generally, however, duplicating these transmissions may result in having more pilot tones than may otherwise be necessary, as the number of pilot tones may not grow linearly as the number of data tones grows. That is, in larger transmissions, proportionally fewer pilot tones may be needed. For example, it may be possible to double the number of data tones, while only needing two additional pilot tones, rather than requiring that pilot tones also double It may be noted that each 20 MHz portion of the transmission may use either a VHT80-like tone plan of FIG. 5C (when the 20 MHz portion is assigned to only one device) or the 9 26-tone tone groups described above, such as in FIGS. 5A-5B. It may be observed that, when transmitted to a single device, transmitting using a VHT80-like tone plan may allow for 234 data tones in 20 MHz, while using a 26-tone tone group transmission may allow for only 216 data tones (9 tone groups, each with 24 data tones and 2 pilot tones). Accordingly, it may be more efficient to use the 242 usable tone VHT80-like portions when possible, in order to allow for more data tones to be transmitted in a given bandwidth. It may also be observed that the use of such a 20 MHz portion still allows for each 20 MHz portion of a transmission to includes its own edge tones and DC tones, such that the 20 MHz portion may be received by an 'HE20-mode' device which may be configured to receive only a 20 MHz transmission, and not larger transmissions.

FIGS. 6A-6D illustrate 40 MHz transmissions according to various implementations. In particular, the illustrated 40 MHz transmissions show the embodiments discussed above with respect to FIG. 4. For implementations using 19 26-tone TAUs, each 40 MHz transmission includes a number of usable tones for OFDMA equal to floor((512−14)/26)*26=19*26=494, which is greater than for implementations using two 242-tone TAUs (2*242=484), which is greater than for implementations using 18 26-tone TAUs (18*26=468). In such implementations, the maximum number of DC and edge tones is 18 for implementations using 19 26-tone TAUs, 28 for implementations using two 242-tone TAUs, and 44 for implementations using 18 26-tone TAUs. In general, each transmission can distribute these DC and edge tones as X left edge tones, Z DC tones, and Y right guard tones. In some embodiments, the number of right edge tones Y is one less than the number of left edge tones X.

Moreover, in some embodiments, the number of DC tones Z is greater or equal to three, and an odd number. Thus, various implementations using 19 26-tone TAUs can use 3 DC tones and 15 edge tones, 5 DC tones and 13 edge tones, or 7 DC tones and 11 edge tones. Various implementations using two 242-tone TAUs with no sub-allocation DC tones can use 9 DC tones and 19 edge tones, 7 DC tones and 21 edge tones, 5 DC tones and 23 edge tones, or 3 DC tones and 25 edge tones. Various implementations using two 242-tone TAUs with sub-allocation DC tones can use 11 DC tones, 11 edge tones, and two sets of 3 sub-allocation DC tones. Various implementations using 18 26-tone TAUs can use 5 DC tones and 39 edge tones, 7 DC tones and 37 edge tones, and so on with no sub-allocation DC tones. Other implementations using 18 26-tone TAUs can use 3 DC tones and 19 edge tones.

FIG. 6A is an illustration of a 40 MHz transmission that uses certain tones in the 20 MHz-compatible transmission as additional useable tones. For example, in certain aspects, all the STAs that are sending or receiving data in a given transmission may be compatible with 40 MHz transmissions. That is, there may not be any STAs that need a 20 MHz portion that includes its own guard and DC tones in a given transmission. Accordingly, it may be beneficial to provide a mechanism whereby certain tones that were guard or DC tones in transmission 600A may be "grabbed" so that they may become useable tones (pilot or data tones, which can be assigned to a device). Thus, transmission 600A includes each of the 18 26-tone allocations of transmission 500A, in the same tone locations.

However, in addition to this, transmission 600A includes one additional 26-tone allocation which may be assigned to a device. This additional 26-tone allocation is made up of the 14 tones (7 on each side) that would otherwise be DC tones for a 20 MHz portion in transmission 600A. Since no HE20-mode devices are included in transmission 600A, these additional DC tones may not be needed. Accordingly, these 14 tones may be repurposed as usable tones. Further, 5 tones from each side (10 tones in total) of the 15 central DC tones of transmission 600A may be repurposed as usable tones as well. This may result in transmission 600A having only 5 DC tones. Finally, transmission 2950 may also have one tone on each side repurposed from being a guard tone in transmission 600A to being a usable tone.

Thus, transmission 600A may contain each of the tone allocation units of two transmissions 500A. However, transmission 600A may further contain one additional tone allocation unit. This additional tone allocation unit may be made up of tones which were used, in two transmissions 500A, as 2 edge tones, 14 'HE20' DC tones, and 10 DC tones. These 26 tones may be combined together to form one additional tone allocation unit, such that transmission 600A may contain 19 26-tone allocations.

The transmission 600A includes X left edge tones and Y right edge tones. Edge tones may be transmitted with no data on them, in order to provide a buffer between the data tones in the transmissions and transmissions which might occur on other portions of the wireless medium. The transmission 600A further includes Z DC tones, which may be positioned in the center of all the tones in the transmission. For example, the transmission 600A may include tones numbered sequentially using index numbers from −256 (on the left) to 255 (on the right). The DC tones may be in the center of the tones. In an embodiment, $X+Y+Z=18$, and Z is an odd integer greater than or equal to 3. In an embodiment, the transmission 600A does not support HE20.

FIG. 6B is an illustration of example 40 MHz transmissions 600B and 650B using 26-tone allocations. The 40 MHz transmissions 600B and 650B include 512 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −256 (on the left) to 255 (on the right). The DC tones may be in the center of the tones. In an embodiment, $X+Y+Z=18$, and Z is an odd integer greater than or equal to 3.

The transmission 600B may include nine contiguous 26-tone allocations on the left side of the DC tones, and nine contiguous 26-tone allocations on the right side of the DC tones. Further, the transmission 600B may include 13 additional data tones on each side of the DC tones. These 13 additional data tones on each side may be combined together, in order to form a 19th 26-tone allocation. Accordingly, the transmission 600B may include 19 26-tone allocations, each of which may include 24 data tones and 2 pilot tones.

In various embodiments, the 19th 26-tone allocation can be located on each side of the DC tones when the transmission 600B has more than or equal to 7 DC tones. In another embodiment, when the transmission has more than or equal to 19 edge tones, the 19th 26-tone allocation can be located at the edges of the transmission. In an embodiment, the transmission 600B does not support HE20.

The transmission 650C may include nine contiguous 26-tone allocations on the left side of the DC tones, and nine contiguous 26-tone allocations on the right side of the DC tones. Further, the transmission 650C may include 13 additional data tones on each side of the first eighteen 26-tone allocations. These 13 additional data tones on each side may be combined together, in order to form a 19th 26-tone allocation. Accordingly, the transmission 650C may include 19 26-tone allocations, each of which may include 24 data tones and 2 pilot tones.

In various embodiments, the 19th 26-tone allocation can be located at the edges of the transmission when the transmission 650C has more than or equal to 19 edge tones. In another embodiment, when the transmission has more than or equal to 7 DC tones, the 19th 26-tone allocation can be located on each side of the DC tones. In an embodiment, the transmission 650B does not support HE20.

FIG. 6C is an illustration of example 40 MHz transmissions 600C and 650C using 242-tone allocations. As illustrated, a 40 MHz transmission may include two 242-tone allocations, either with 3 DC tones (in the center of the 20 MHz portion, see transmission 600C) or without sub-DC tones (see transmission 650C). In some aspects, this transmission 600C may include 6 left edge tones and 5 right edge tones, as well as 11 DC tones (which, it may be observed, are made up from the left and right edge tones of the two 20 MHz portions). The transmission 650C can include X left edge tones and Y right edge tones. Edge tones may be transmitted with no data on them, in order to provide a buffer between the data tones in the transmissions and transmissions which might occur on other portions of the wireless medium. The transmission 650C further includes Z DC tones, which may be positioned in the center of all the tones in the transmission. The transmission includes X left edge tones and Y right edge tones. In an embodiment, $X+Y+$ Z=28, and Z is an odd integer greater than or equal to 3. In an embodiment, the transmission 600C can support HE20, whereas the transmission 600D does not support HE20.

FIG. 6D is an illustration of example 40 MHz transmissions 600D and 650D using 26-tone allocations. As illustrated, a 40 MHz transmission 600D includes two 20 MHz transmissions 500A, and a 40 MHz transmission 650D includes two 20 MHz transmissions 500B. The transmissions 600D and 650D can include X left edge tones and Y right edge tones. Edge tones may be transmitted with no data on them, in order to provide a buffer between the data tones in the transmissions and transmissions which might occur on other portions of the wireless medium. The transmissions 600D and 650D further include two sets of Z sub-allocation DC tones and X+Y DC tones, which may be positioned in the center of all the tones in the transmission. In an embodiment, X+Y+Z=22, and Z is an odd integer greater than or equal to 3. In an embodiment, the transmissions 600D and 650D can support HE20.

In some embodiments, a common or control channel (together with DC and edge tones) can use the leftover tones. For example, for 20 MHz transmissions, a common/control resource block can be selected to be the leftover tones and/or the 9th 26-tone block. For 40 MHz transmissions, a common/control resource block can be selected to be the leftover tones and/or the 19th 26-tone block. For 40 MHz transmissions, a common/control resource block can be selected to be the leftover tones. In various embodiments, the common/control channel can be used for any of: UL and/or DL, for time/frequency synchronization, sounding, packet detection, collection of a list of neighbors for adaptive CCA, in UL for bystander information about the UL schedule, etc. In some embodiments, the AP 104 is responsible for transmitting on the common/control channel. In other embodiments, STAs or bystanders can transmit on the common/control channel. In some embodiments, bystanders can monitor the UL common/control channel and process messages thereon. In some embodiments, all STAs 106 in a multiuser group can process DL messages on the common/control channel.

Referring back to FIG. 4, transmissions can be formed from a combination of one or more 26-tone TAUs, or one or more 242-tone TAUs. For example, a 20 MHz transmission can be formed from any of the 20 MHz transmissions discussed herein. A 40 MHz transmission can be formed from any combination of 20 MHz transmissions or 40 MHz transmissions discussed herein. An 80 MHz transmission can be formed from any combination of 20 MHz, 40 MHz, or 80 MHz transmissions discussed herein.

Figure 7:
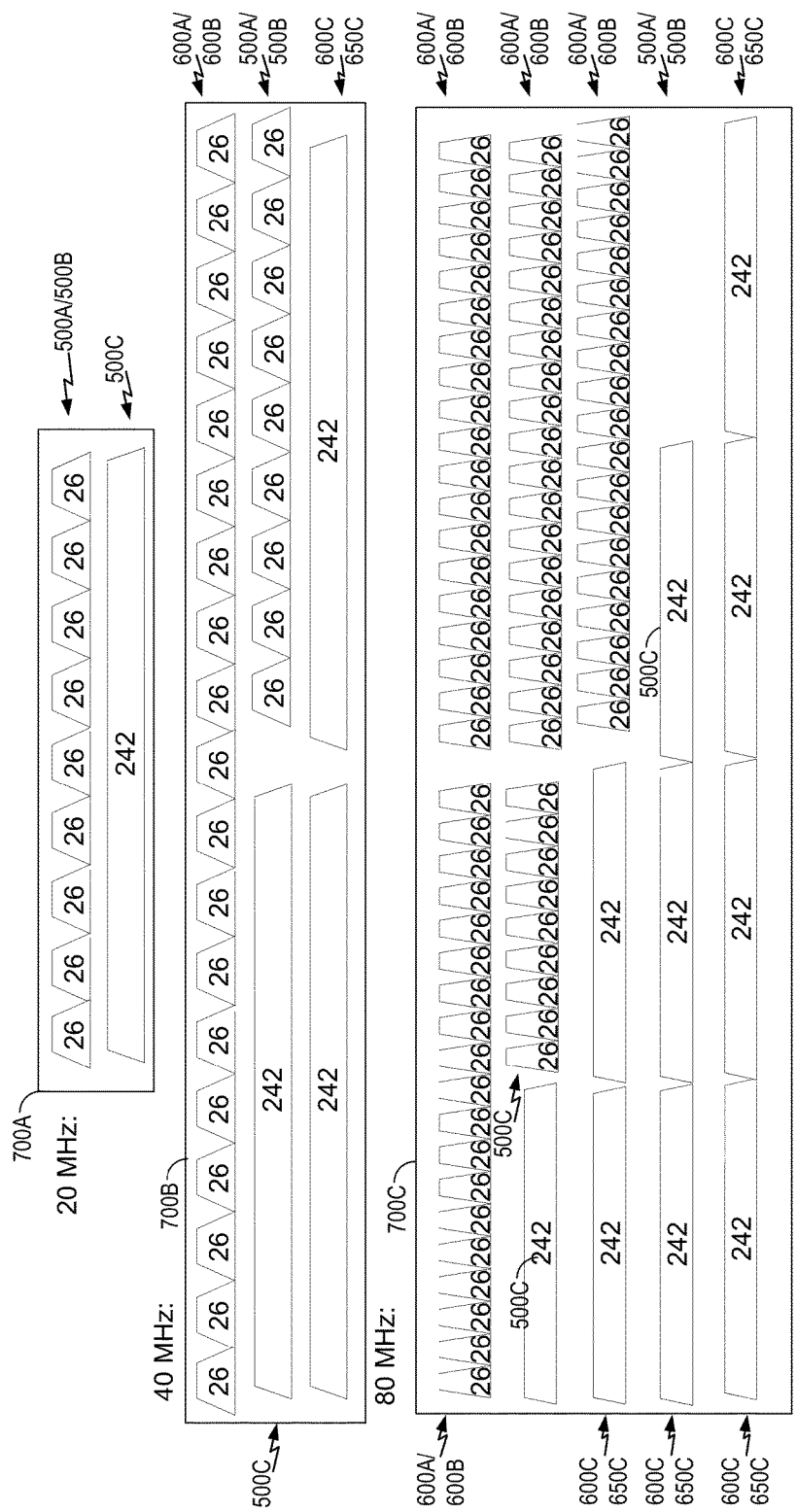
FIG. 7 is an illustration of an example 20 MHz transmission, 40 MHz transmission, and 80 MHz transmission.

FIG. 7 is an illustration of an example 20 MHz transmission 700A, 40 MHz transmission 700B, and 80 MHz transmission 700C. In the illustrated embodiment, the 20 MHz transmission 700A can be formed from either nine 26-tone blocks or one 242-tone block. For example, the 20 MHz transmission 700A can be formed from any of the 20 MHz transmissions 500A, 500B, or 500C.

The illustrated 40 MHz transmission 700B can be formed from any combination of 26-tone blocks and 242-tone blocks. For example, the 40 MHz transmission 700B can be formed from nineteen 26-tone blocks, one 242-tone block and nine 26-tone blocks, or two 242-tone blocks. Accordingly, the 40 MHz transmission 700B can be formed from any combination of the 20 MHz transmissions 500A, 500B, and 500C, the 40 MHz transmissions 600A and 600B, and the 40 MHz transmissions 600C and 650C. Although transmissions are illustrated in a specific order herein, a person having ordinary skill in the art will appreciate that constituent transmissions can be rearranged or reordered within the scope of this disclosure.

The illustrated 80 MHz transmission 700C can be formed from any combination of 26-tone blocks and 242-tone blocks. For example, the 80 MHz transmission 700C can be formed from thirty-eight 26-tone blocks, one 242-tone block and forty-seven 26-tone blocks, two 242-tone blocks and thirty-eight 26-tone blocks, three 242-tone blocks and nine 26-tone blocks, or four 242-tone blocks. Accordingly, the 80 MHz transmission 700C can be formed from any combination of the 20 MHz transmissions 500A, 500B, and 500C, the 40 MHz transmissions 600A and 600B, and the 40 MHz transmissions 600C and 650C. Although transmissions are illustrated in a specific order herein, a person having ordinary skill in the art will appreciate that constituent transmissions can be rearranged or reordered within the scope of this disclosure.

In various embodiments, the AP 104 can assign various combinations of blocks within each transmission to one or more STAs 106. Each combination and ordering of constituent blocks, and assignment sizes, can be referred herein as an allocation type, which can also be called an allocation schema. For example, using the 40 MHz transmission 700B discussed above as an example, a first allocation type can include nineteen separate allocations of a single 26-tone block. A second example allocation type can include nine separate allocations of two 26-tone blocks (52 tones per allocation) and a single additional allocation of a single 26-tone block. A third example allocation type can include a single allocation of a single 242-tone block and nine separate allocations of a single 26-tone block.

The foregoing allocation types are included for illustrative purposes, and various embodiments of the present application are not limited to any particular allocation type. In general, an AP 104 or STA 106 can support a number of allocation types NAllocTypes(BW), for each bandwidth BW. Within each allocation type, there can be Nalloc separate allocations. In various embodiments, each allocation can be identified by an allocation index, which can be log 2(NAllocTypes(BW)) bits. As discussed above, each allocation can be of various sizes (for example, multiples of 26-tone blocks and/or 242-tone blocks) and can include various combinations of tone blocks. Additional embodiments of allocation types are described below with respect to FIGS. 8A-8F.

Figures 8A, 8B:
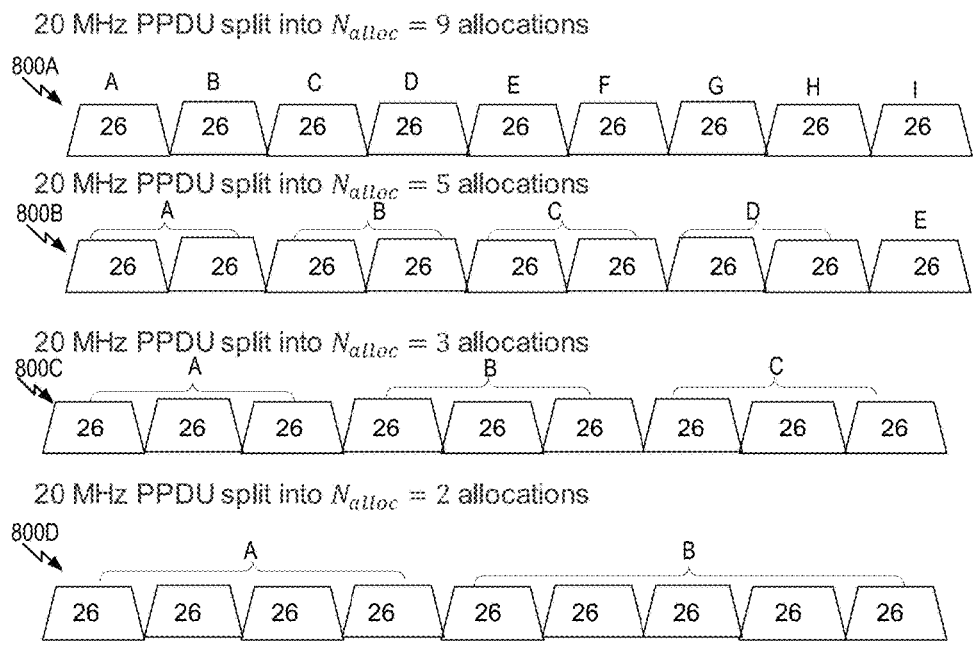
FIG. 8A illustrates five example allocation types for 20 MHz transmissions.
FIG. 8B shows example allocation indexes for the allocation types of FIG. 8A.

FIG. 8A illustrates five example allocation types 800A-800D for 20 MHz transmissions. A first example allocation type 800A includes nine separate allocations A-I of single 26-tone blocks. A second example allocation type 800B includes four separate allocations A-D of two 26-tone blocks each (for a total of 52 tones per allocation), and a single allocation E of a single 26-tone block, for a total of 5 allocations. A third example allocation type 800C includes three separate allocations A-C of three 26-tone blocks each (for a total of 78 tones per allocation). A fourth example allocation type 800D includes one allocation A of four 26-tone blocks (for a total of 104 tones per allocation) and one allocation B of five 26-tone blocks (for a total of 130 tones per allocation).

Although FIG. 8A shows four specific example allocation types 800A-800D for 20 MHz transmissions, other allocation types can include any other combination of 26-tone blocks and 242-tone blocks. For example, a fifth example allocation type can include a single allocation of a single 242-tone block. Moreover, although allocations are shown as including only contiguous tone blocks, other embodiments can include non-contiguous allocations.

FIG. 8B shows example allocation indexes for the allocation types 800A-800D of FIG. 8A. As shown, the first allocation type 800A, having nine allocations, can be assigned an allocation index of 0b00. The second allocation type 800B, having five allocations, can be assigned an allocation index of 0b01. The third allocation type 800C, having three allocations, can be assigned an allocation index of 0b10. The fourth allocation type 800D, having two allocations, can be assigned an allocation index of 0b11. Although a two-bit allocation index is shown in FIG. 8B, larger indexes can be used. In various embodiments, the allocation index can be between one and six bits. In some embodiments, the allocation index can be between two and four bits. Accordingly, in some embodiments, there can be up to 16 different allocation types.

Figure 8C:
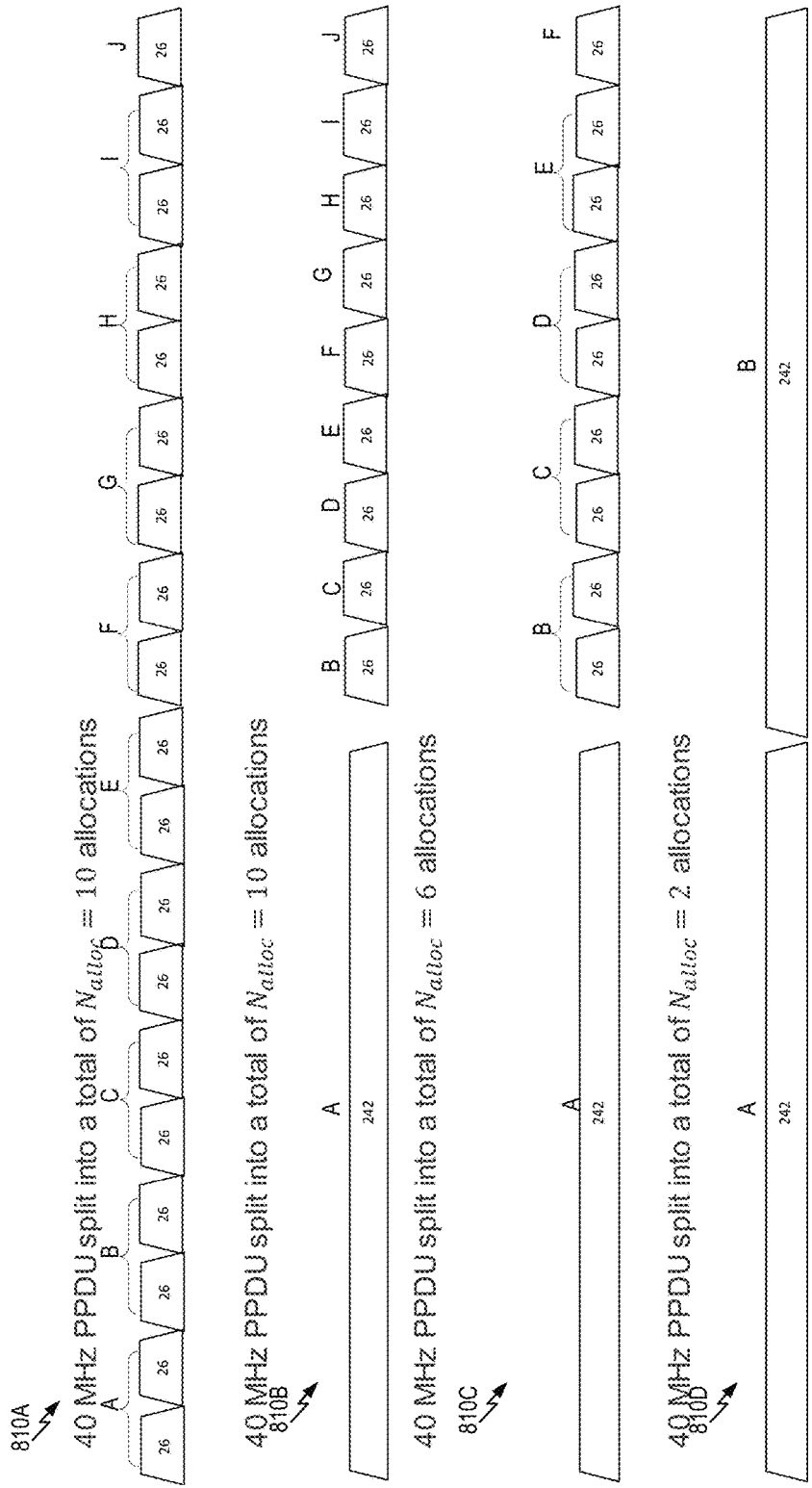
FIG. 8C illustrates five example allocation types for 40 MHz transmissions.

FIG. 8C illustrates five example allocation types 810A-800D for 40 MHz transmissions. A first example allocation type 810A includes nine separate allocations A-I of two 26-tone blocks each (for a total of 52 tones per allocation), and a single allocation J of a single 26-tone block, for a total of 10 allocations. A second example allocation type 810B includes a single allocation A of a 242-tone block and nine separate allocations B-J of a single 26-tone block each, for a total of 10 allocations. A third example allocation type 810C includes a single allocation A of a 242-tone block, four separate allocations B-E of two 26-tone blocks each (for a total of 52 tones per allocation), and a single allocation F of a 26-tone block, for a total of 6 allocations. A fourth example allocation type 810D includes two separate allocations A-B of single 242-tone blocks.

Although FIG. 8C shows four specific example allocation types 810A-800D for 40 MHz transmissions, other allocation types can include any other combination of 26-tone blocks and 242-tone blocks. For example, a fifth example allocation type can include the allocation type 810C, only reversed in order. Accordingly, the fifth example allocation type can include a single allocation A of a 26-tone block, four separate allocations B-E of two 26-tone blocks each (for a total of 52 tones per allocation), and single allocation F of a 242-tone block. Moreover, although allocations are shown as including only contiguous tone blocks, other embodiments can include non-contiguous allocations.

FIG. 8D shows example allocation indexes for the allocation types 810A-810D of FIG. 8C. As shown, the first allocation type 810A, having ten allocations, can be assigned an allocation index of 0b00. The second allocation type 810B, having ten allocations, can be assigned an allocation index of 0b01. The third allocation type 810C, having six allocations, can be assigned an allocation index of 0b10. The fourth allocation type 810D, having two allocations, can be assigned an allocation index of 0b11. Although a two-bit allocation index is shown in FIG. 8D, larger indexes can be used. In various embodiments, the allocation index can be between one and six bits. In some embodiments, the allocation index can be between two and four bits. Accordingly, in some embodiments, there can be up to 16 different allocation types.

Figure 8E:
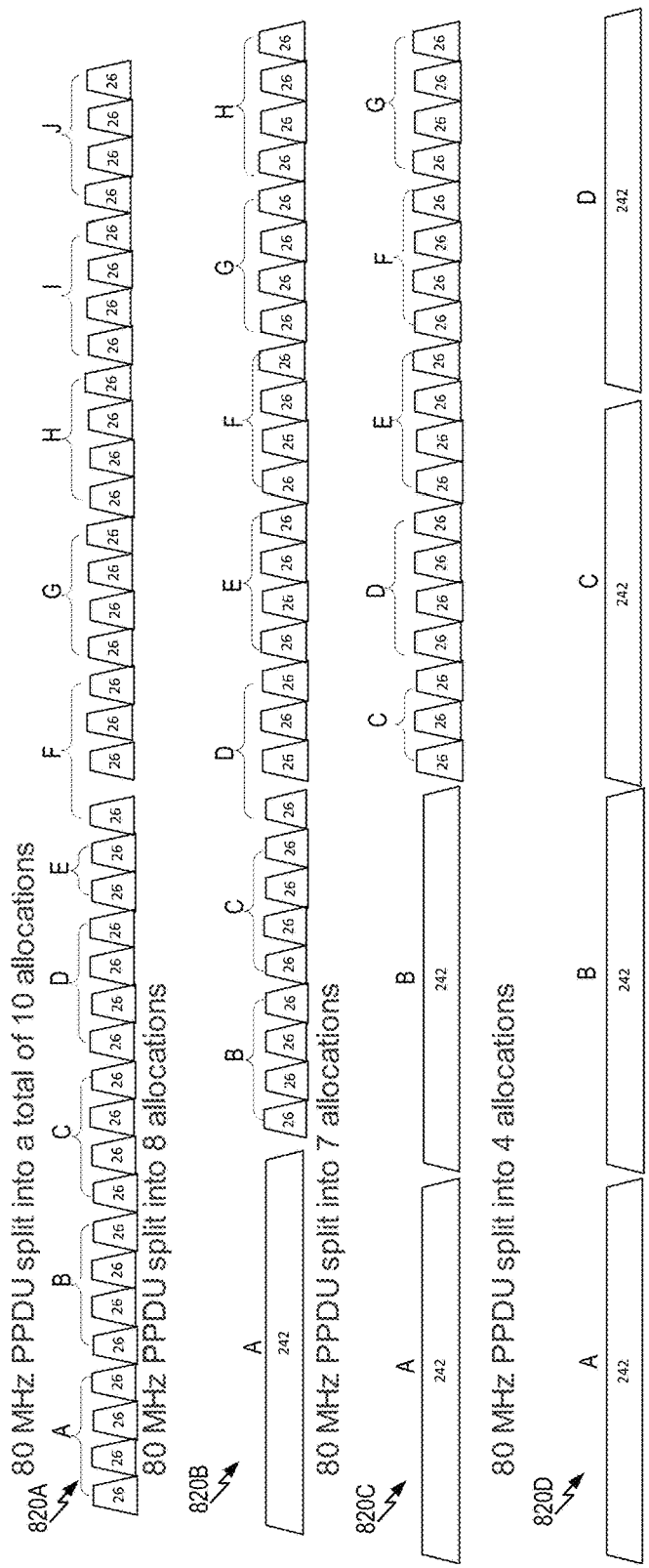
FIG. 8E illustrates five example allocation types for 80 MHz transmissions.

FIG. 8E illustrates five example allocation types 820A-800D for 80 MHz transmissions. A first example allocation type 820A includes ten separate allocations A-J of four 26-tone blocks each (for a total of 104 tones per allocation). A second example allocation type 820B includes a single allocation A of a 242-tone block and seven separate allocations B-H of four 26-tone blocks each (for a total of 104 tones per allocation), for a total of 8 allocations. A third example allocation type 820C includes a two separate allocations A-B of 242-tone blocks each, a single allocation C of three 26-tone blocks each (for a total of 78 tones per allocation), and four separate allocations D-G of four 26-tone blocks each (for a total of 104 tones per allocation), for a total of 7 allocations. A fourth example allocation type 820D includes four separate allocations A-D of single 242-tone blocks.

Although FIG. 8E shows four specific example allocation types 820A-800D for 80 MHz transmissions, other allocation types can include any other combination of 26-tone blocks and 242-tone blocks. For example, a fifth example allocation type can include the allocation type 820B, with the allocation A being swapped with allocations B and C. Accordingly, the fifth example allocation type can include a single allocation A of four 26-tone blocks each (for a total of 104 tones per allocation), a single allocation B of five 26-tone blocks each (for a total of 130 tones per allocation), a single allocation C of a 242-tone block a single allocation D of three 26-tone blocks each (for a total of 78 tones per allocation), and four separate allocations E-H of four 26-tone blocks each (for a total of 104 tones per allocation), for a total of 8 allocations. Moreover, although allocations are shown as including only contiguous tone blocks, other embodiments can include non-contiguous allocations.

FIG. 8F shows example allocation indexes for the allocation types 820A-820D of FIG. 8E. As shown, the first allocation type 820A, having ten allocations, can be assigned an allocation index of 0b00. The second allocation type 820B, having eight allocations, can be assigned an allocation index of 0b01. The third allocation type 820C, having seven allocations, can be assigned an allocation index of 0b10. The fourth allocation type 820D, having four allocations, can be assigned an allocation index of 0b11. Although a two-bit allocation index is shown in FIG. 8F, larger indexes can be used. In various embodiments, the allocation index can be between one and six bits. In some embodiments, the allocation index can be between two and four bits. Accordingly, in some embodiments, there can be up to 16 different allocation types.

When the AP 104 allocates tone-blocks to STAs 106, it can transmit an indication of the allocation type used. In various embodiments, the indication can include the allocation index discussed above with respect to FIGS. 8A-8F. In various embodiments, the AP 104 can allocate tone blocks to STAs 106 using a tone block allocation shown in FIG. 9.

Figure 9:
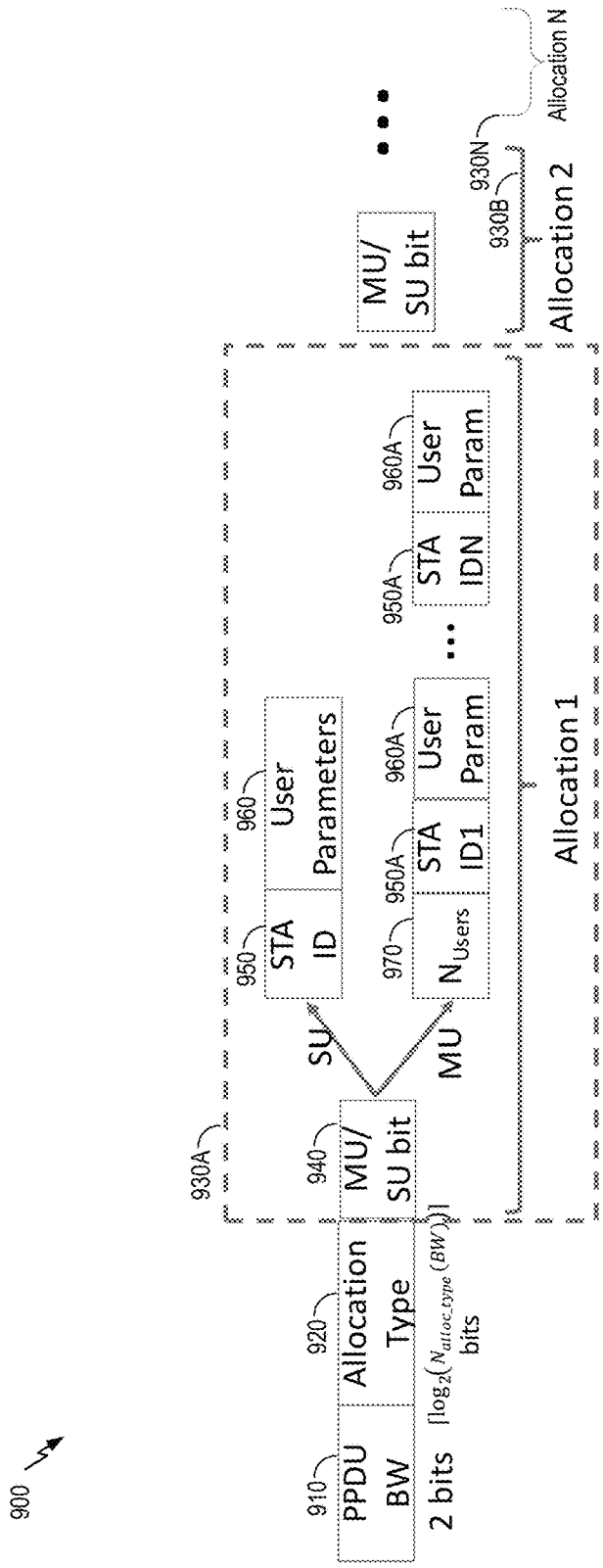
FIG. 9 shows an example tone block allocation 900 according to one embodiment.

FIG. 9 shows an example tone block allocation 900 according to one embodiment. The AP 104 can transmit the allocation 900 in a signal field of a packet such as, for example, a DL 802.11ax frame. In some embodiments, the AP 104 can transmit the allocation 900 in a high-efficiency (HE) signal (SIG) field. In some embodiments, HE-SIG field can be decoded only by a subset of devices on a network. In some embodiments, the AP 104 can transmit the allocation 900 in one or more portions of the HE-SIG field, such as a HE-SIGA or HE-SIGB field.

The illustrated allocation 900 includes a PPDU BW field 910, an allocation type field 920, and one or more user allocations 930A-930N. In various embodiments, there can be a single user allocation 930A-930N for each allocation (such as the allocations A-I of FIGS. 8A-8F). A person having ordinary skill in the art will appreciate that the various fields described herein can be rearranged, resized, some fields can be omitted, and additional fields can be added The PPDU BW field 910 serves to indicate a transmission bandwidth of the allocation 900. In the illustrated embodiment, the PPDU BW field 910 is 2 bits long. For example, for 20 MHz transmissions, the PPDU BW field 910 can be 0b00, for 40 MHz transmissions, the PPDU BW field 910 can be 0b01, and for 80 MHz transmissions the PPDU BW field 910 can be 0b10 (although other mappings are possible and contemplated within the scope of this disclosure). In various embodiments, the PPDU BW field 910 can be between 1 and 4 bits long, between 1 and 6 bits long, or a variable length.

The allocation type field 920 serves to indicate the allocation type of the allocation 900. In the illustrated embodiment, the allocation type field 920 is log 2(NAllocTypes (BW)) bits long. For example, the allocation type field 920 can be the allocation index discussed above with respect to FIGS. 8A-8F. In various embodiments, In various embodiments, the allocation type field 920 can be between 1 and 4 bits long assuming no more than 16 allocation types for a given PPDU BW.

The user allocations 930A-930N serve to allocate tone blocks to STAs 106. Because the allocation index indicates the number of allocations in the allocation type, the number of user allocations fields 930A-930N can be derived from the allocation type field 920, which can also indicate the total length of the allocation 900. Each user allocation 930A-930N can include a multi-user (MU)/single-user (SU) indication 940.

The MU/SU indication 940 serves to indicate whether the associated user allocation 930A-930N is assigned to a single user or shared between multiple users (for example, via MU-MIMO). For example, when the MU/SU indication 940 is 0b0, it can indicate a SU allocation, and when the MU/SU indication 940 is 0b1, it can indicate s MU allocation (or vice versa). In the illustrated embodiment, MU/SU indication 940 is a single bit flag. In various embodiments, the MU/SU indication 940 can be between 1 and 6 bits long, between 2 and 4 bits long, or a variable length.

When a particular user allocation 930A-930N is a SU allocation, the user allocation 930A-930N can include a STA ID 950 and one or more user parameters 960. The STA ID 950 can serve to identify the STA 106 to which the nth allocation is assigned, where n is the ordinal of the particular user allocation 930A-930N in the list of user allocations 930A-930N. For example, referring again to FIG. 8A, if the allocation type 920 is 0b00, and the first MU/SU indication 940 is 0b0, the first STA ID 950 can indicate the STA 106 allocation the allocation A in the allocation type 800. In various embodiments, the STA ID 950 can be a partial or complete identifier for the STA 106, for example a PAID, AID, or GID.

The user parameters 960 serve to indicate one or more communication parameters applicable to each user sharing a wireless resource. For example, the user parameters can include one or more of a modulation and coding scheme (MCS), a transmit beamforming (TxBF) parameter, a number of space-time-streams (Nsts), and the like. In various embodiments, the user parameters 960 can be of fixed or variable length.

When a particular user allocation 930A-930N is a MU allocation, the user allocation 930A-930N can include a number of users 970 allocated to the particular user allocation 930A-930N, followed by a list of STA IDs 950A-950N and user parameters 960A-960N. In some embodiments, the number of users that can be assigned to the same allocation can be less than or equal to 8. Thus, in the illustrated embodiment, the number of users 970 can be three bits long.

In various embodiments, the number of users 970 can be between 1 and 5 bits long, between 2 and 4 bits long, or a variable length.

Figure 10:
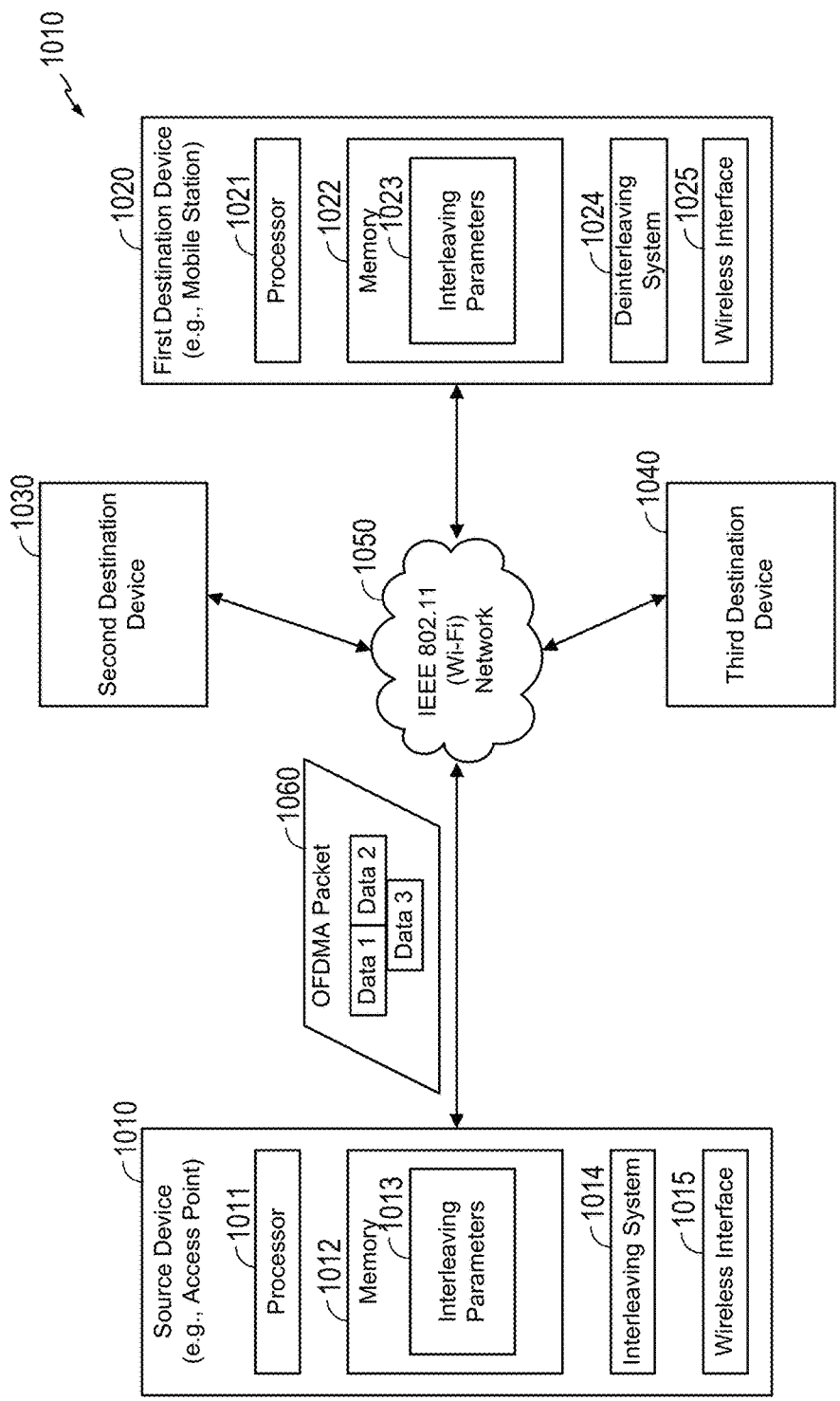
FIG. 10 shows a system that is operable to generate interleaving parameters for orthogonal frequency-division multiple access (OFDMA) tone plans, according to an embodiment.

FIG. 10 shows a system 1000 that is operable to generate interleaving parameters for orthogonal frequency-division multiple access (OFDMA) tone plans, according to an embodiment. The system 1000 includes a first device (e.g., a source device) 1010 configured to wirelessly communicate with a plurality of other devices (e.g., destination devices) 1020, 1030, and 1040 via a wireless network 1050. In alternate embodiments, a different number of source devices destination devices can be present in the system 1000. In various embodiments, the source device 1010 can include the AP 104 (FIG. 1) and the other devices 1020, 1030, and 1040 can include STAs 106 (FIG. 1). The system 1000 can include the system 100 (FIG. 1). In various embodiments, any of the devices 1010, 1020, 1030, and 1040 can include the wireless device 202 (FIG. 2).

In a particular embodiment, the wireless network 1050 is an Institute of Electrical and Electronics Engineers (IEEE) 802.11 wireless network (e.g., a Wi-Fi network). For example, the wireless network 1050 can operate in accordance with an IEEE 802.11 standard. In a particular embodiment, the wireless network 1050 supports multiple access communication. For example, the wireless network 1050 can support communication of a single packet 1060 to each of the destination devices 1020, 1030, and 1040, where the single packet 1060 includes individual data portions directed to each of the destination devices. In one example, the packet 1060 can be an OFDMA packet, as further described herein.

The source device 1010 can be an access point (AP) or other device configured to generate and transmit multiple access packet(s) to multiple destination devices. In a particular embodiment, the source device 1010 includes a processor 1011 (e.g., a central processing unit (CPU), a digital signal processor (DSP), a network processing unit (NPU), etc.), a memory 1012 (e.g., a random access memory (RAM), a read-only memory (ROM), etc.), and a wireless interface 1015 configured to send and receive data via the wireless network 1050. The memory 1012 can store binary convolutional code (BCC) interleaving parameters 1013 used by an interleaving system 1014 to interleave data according to the techniques described with respect to an interleaving system 1014 of FIG. 11.

As used herein, a "tone" can represent a frequency or set of frequencies (e.g., a frequency range) within which data can be communicated. A tone can alternately be referred to as a subcarrier. A "tone" can thus be a frequency domain unit, and a packet can span multiple tones. In contrast to tones, a "symbol" can be a time domain unit, and a packet can span (e.g., include) multiple symbols, each symbol having a particular duration. A wireless packet can thus be visualized as a two-dimensional structure that spans a frequency range (e.g., tones) and a time period (e.g., symbols).

As an example, a wireless device can receive a packet via a 20 megahertz (MHz) wireless channel (e.g., a channel having 20 MHz bandwidth). The wireless device can perform a 256-point fast Fourier transform (FFT) to determine 256 tones in the packet. A subset of the tones can be considered "useable" and the remaining tones can be considered "unusable" (e.g., can be guard tones, direct current (DC) tones, etc.). To illustrate, 238 of the 256 tones can be useable, which may include a number of data tones and pilot tones.

In a particular embodiment, the interleaving parameters 1013 can be used by the interleaving system 1014 during generation of the multiple access packet 1060 to determine which data tones of the packet 1060 are assigned to individual destination devices. For example, the packet 1060 can include distinct sets of tones allocated to each individual destination device 1020, 1030, and 1040. To illustrate, the packet 1060 can utilize interleaved tone allocation.

The destination devices 1020, 1030, and 1040 can each include a processor (e.g., a processor 1021), a memory (e.g., a memory 1022), and a wireless interface (e.g., a wireless interface 1025). The destination devices 1020, 1030, and 1040 can also each include a deinterleaving system 1024 configured to deinterleave packets (e.g., single access packets or multiple access packets), as described with reference to a MIMO detector 1118 of FIG. 11. In one example, the memory 1022 can store interleaving parameters 1023 identical to the interleaving parameters 1013.

During operation, the source device 1010 can generate and transmit the packet 1060 to each of the destination devices 1020, 1030, and 1040 via the wireless network 1050. The packet 1060 can include distinct sets of data tones that are allocated to each individual destination device according to an interleaved pattern.

The system 1000 of FIG. 10 can thus provide OFDMA data tone interleaving parameters for use by source devices and destination devices to communicate over an IEEE 802.11 wireless network. For example, the interleaving parameters 1013, 1023 (or portions thereof) can be stored in a memory of the source and destination devices, as shown, can be standardized by a wireless standard (e.g., an IEEE 802.11 standard), etc. It should be noted that various data tone plans described herein can be applicable for both downlink (DL) as well as uplink (UL) OFDMA communication.

For example, the source device 1010 (e.g., an access point) can receive signal(s) via the wireless network 1050. The signal(s) can correspond to an uplink packet. In the packet, distinct sets of tones can be allocated to, and carry uplink data transmitted by, each of the destination devices (e.g., mobile stations) 1020, 1030, and 1040.

Figure 11:
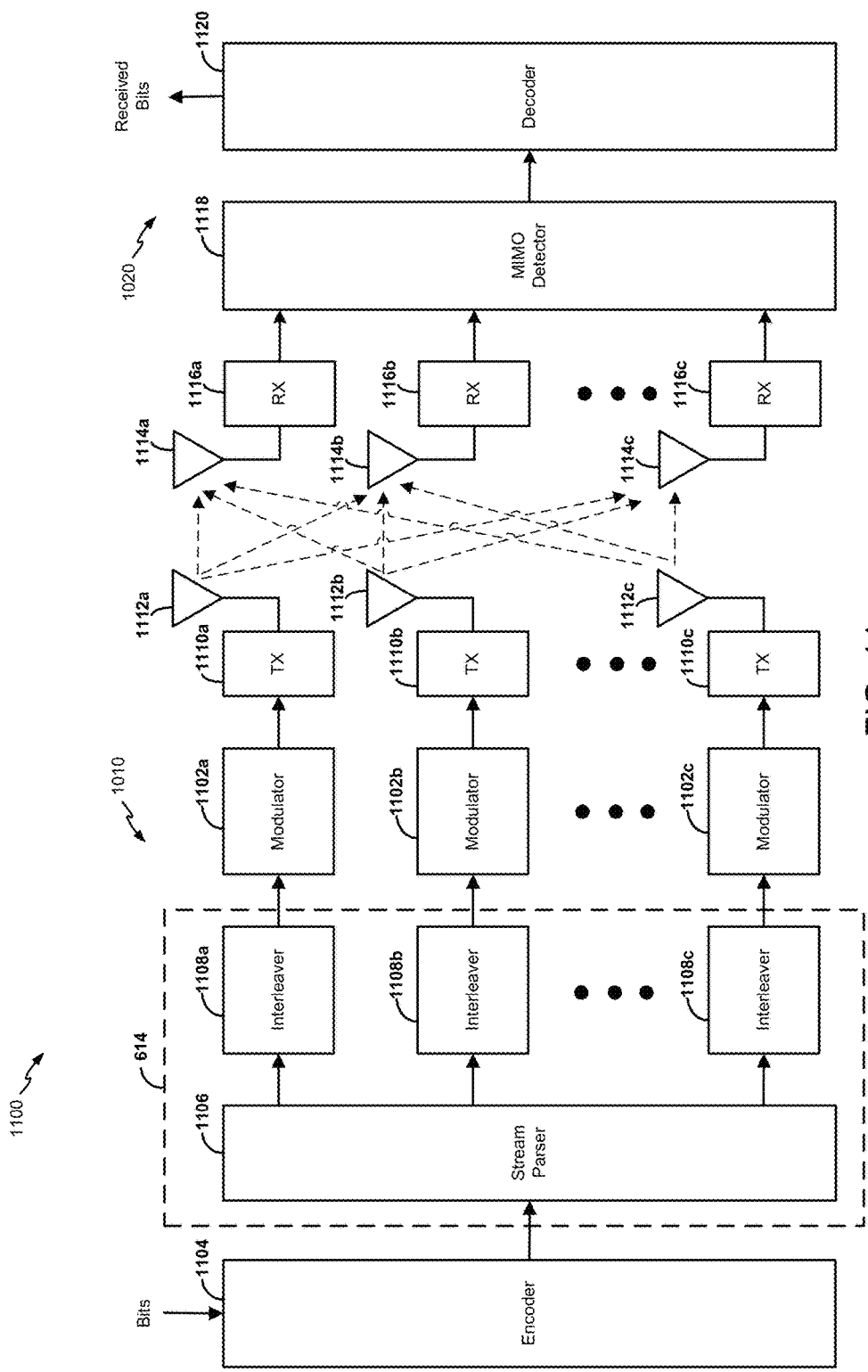
FIG. 11 shows an example multiple-input-multiple-output (MIMO) system that can be implemented in wireless devices, such as the wireless device of FIG. 10, to transmit and receive wireless communications.

FIG. 11 shows an example multiple-input-multiple-output (MIMO) system 1100 that can be implemented in wireless devices, such as the wireless device of FIG. 10, to transmit and receive wireless communications. The system 1100 includes the first device 1010 of FIG. 10 and the destination device 1020 of FIG. 10.

The first device 1010 includes an encoder 1104, the interleaving system 1014, a plurality of modulators 1102a-1102c, a plurality of transmission (TX) circuits 1110a-1110c, and a plurality of antennas 1112a-1112c. The destination device 1020 includes a plurality of antennas 1114a-1114c, a plurality of receive (RX) circuits 1116a-1116c, a MIMO detector 1118, and a decoder 1120.

A bit sequence can be provided to the encoder 1104. The encoder 1104 can be configured to encode the bit sequence. For example, the encoder 1104 can be configured to apply a forward error correcting (FEC) code to the bit sequence. The FEC code can be a block code, a convolutional code (e.g., a binary convolutional code), etc. The encoded bit sequence can be provided to the interleaving system 1014.

The interleaving system 1014 can include a stream parser 1106 and a plurality of spatial stream interleavers 1108a-1108c. The stream parser 1106 can be configured to parse the encoded bit stream from the encoder 1104 to the plurality of spatial stream interleavers 1108a-1108c.

Each interleaver 1108a-1108c can be configured to perform frequency interleaving. For example, the stream parser 1106 can output blocks of coded bits per symbol for each spatial stream. Each block can be interleaved by a corresponding interleaver 1108a-1108c that writes to rows and reads out columns. The number of columns (Ncol), or the interleaver depth, can be based on the number of data tones (Ndata). The number of rows (Nrow) can be a function of the number of columns (Ncol) and the number of data tones (Ndata). For example, the number of rows (Nrow) can be equal to the number of data tones (Ndata) divided by the number of columns (Ncol) (e.g., Nrow=Ndata/Ncol).

Figure 12:
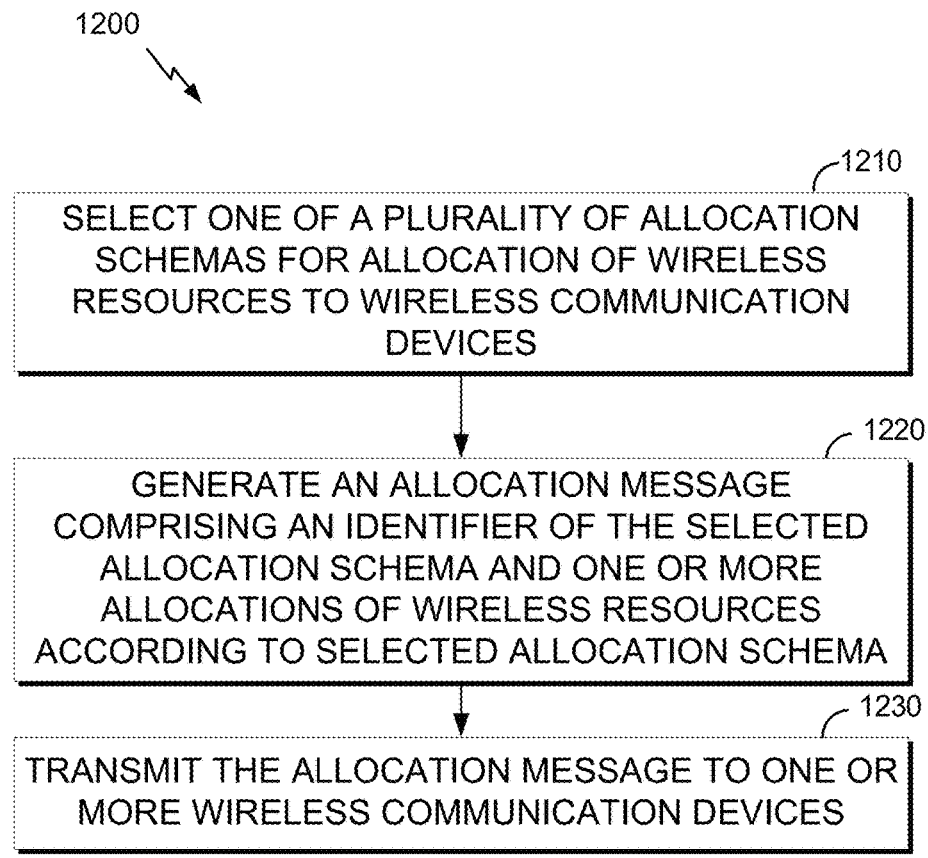
FIG. 12 shows a flowchart for an example method of communicating over a wireless communication network using a tone allocation unit.

FIG. 12 shows a flowchart 900 for an example method of communicating over a wireless communication network. The method can be used to divide a bandwidth between a number of different devices, in order to allow those devices to transmit or receive an uplink or a downlink OFDMA transmission. The method can be implemented in whole or in part by the devices described herein, such as the wireless device 202 shown in FIG. 2, the STA 106 shown in FIG. 1, or the AP 104 shown in FIG. 1. Although the illustrated method is described herein with reference to the wireless communication system 100 discussed above with respect to FIG. 1, and the transmissions 500A-820D discussed above with respect to FIGS. 5-8, and the allocation 900 discussed above with respect to FIG. 9, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

At block 1210, a wireless device selects one of a plurality of allocation schemas for allocation of wireless resources to wireless communication devices. For example, the AP 104 can select one of the allocation schemas 800A-800D, 810A-810D, or 820A-820D, or another schema. In an embodiment, the AP 104 can select an allocation schema having a number of allocations greater than a number of single-user devices for which the AP 104 has data, plus a number of multi-user devices for which the AP 104 has data divided by a number of multi-user devices sharing each allocation. In various embodiments, the AP 104 can select the allocation schema such that interference is minimized, efficiency is maximized, or according to any other selection criteria.

Next, at block 1220, the wireless device generates an allocation message including an identifier of the selected allocation schema and one or more allocations of wireless resources according to selected allocation schema. For example, the AP 104 can generate the allocation message 900 of FIG. 9. The allocation message can include the allocation identifier 920 as the identifier of the selected allocation schema. The allocation message can include the user allocations 930A-930N as the one or more allocations of wireless resources.

In various embodiments, each of the one or more allocations corresponds to a corresponding ordinal allocation in the selected allocation schema. For example, STAs 106 identified in a first user allocation 930A can be assigned to a first allocation in the selected schema (for example, an allocation A as discussed above with respect to FIGS. 8A-8E). STAs 106 identified in a second user allocation can be assigned to a second allocation in the selected schema (for example, an allocation B as discussed above with respect to FIGS. 8A-8E), and so on for each user allocation through a last user allocation 930N.

In various embodiments, the plurality of allocation schemas can include allocations of one or more 26-tone and 242-tone blocks. For example, the AP 104 can select from one or more schemas that include combinations of 26-tone and 242-tone blocks.

In various embodiments, the plurality of allocation schemas can include 20 MHz schemas, 40 MHz schemas, and 80 MHz schemas. For example, the AP 104 can select from 20 MHz, 40 MHz, and 80 MHz schemas shown in FIGS. 8A-8F. At least one 40 MHz schema can include a portion of a 20 MHz schema. For example, the 40 MHz schema 700B (FIG. 7) can include the 20 MHz schema 700A. In an embodiment, at least one 80 MHz scheme can include a portion of a 20 MHz schema or a 40 MHz schema. For example, the 40 MHz schema 700C (FIG. 7) can include a portion of the 20 MHz schema 700A and/or 40 MHz schema 700B.

In various embodiments, the allocation message can include a two-bit bandwidth indication and a four-bit schema identifier. For example, the AP 104 can generate the PPDU BW field 910 as the bandwidth indication and the allocation type 920 as the schema identifier.

In various embodiments, the allocations each can include an indication indicating whether or not more than one user shares the allocation. For example, the AP 104 can generate each user allocation 930A-930N to include the MU/SU bit 940 as the flag.

In various embodiments, the allocation can include an indication of the number of users sharing the allocation, a station identifier for each user sharing the allocation, and one or more user parameters for each user sharing the allocation. For example, the AP 104 can generate each multi-user allocation 930A-930N to include the STA IDs 950A-950N as the station IDs and the user parameters 960A-960N as the user parameters. In various embodiments, no more than 8 users share each allocation and the indication of the number of users sharing the allocation can include three bits.

In various embodiments, when the indication indicates that more than one user does not share the allocation, the allocation can include a station identifier and one or more user parameters. For example, the AP 104 can generate each multi-user allocation 930A-930N to include the STA ID 950 as the station ID and the user parameters 960 as the user parameters.

Then, at block 1230, the wireless device transmits the allocation message to one or more wireless communication devices. For example, the AP 104 can transmit allocation 900 to one or more STAs 106.

In various embodiments, a STA 106 can receive the allocation 900 as the allocation message. The STA 106 can decode one or more of the bandwidth indication (for example, the PPDU BW 910), the schema identifier (for example, the allocation type 920), and the one or more allocations (for example, the user allocations 930A-930N).

In an embodiment, the STA 106 can determine an AP-selected allocation schema from a plurality of allocation schemas, based on the allocation message. For example, the STA 106 can identify the selected allocation schema associated with the allocation type 920.

The STA 106 can receive one or more downlink messages according to the AP-selected allocation schema. For example, with reference to FIGS. 8A and 9, the STA 106 can receive the allocation 900 from the AP 104 including a PPDU BW 910 of 0b0 (indicating 20 MHz transmission), an allocation type 920 of 0b00, and the second user allocation 930A-930N can include a STA ID 950 for the STA 106. Accordingly, the STA 106 can determine that it is assigned allocation B (the second allocation) from the first 20 MHz schema 800A.

In various embodiments, method can be performed by an access point serving at least one mobile station. A processor of the access point can be configured to transmit the allocation message to the at least one mobile station through a transmitter and antenna of the access point. In various embodiments, transmitting the allocation message can include transmitting at least a portion of the allocation message using a 1× symbol duration of 3.2 ms or a 4× symbol duration of 12.8 ms.

In an embodiment, the method shown in FIG. 12 can be implemented in a wireless device that can include a selecting circuit, a generating circuit, and a transmitting circuit. Those skilled in the art will appreciate that a wireless device can have more components than the simplified wireless device described herein. The wireless device described herein includes components useful for describing some features of implementations.

The selecting circuit can be configured to select the allocation schema. In some embodiments, the selecting circuit can be configured to perform at least block 1210 of FIG. 12. The selecting circuit can include one or more of the processor 204 (FIG. 2), the memory 206 (FIG. 2), and the DSP 220 (FIG. 2). In some implementations, means for selecting can include the selecting circuit.

The generating circuit can be configured to generating the allocation message. In some embodiments, the generating circuit can be configured to perform at least block 1220 of FIG. 12. The generating circuit can include one or more of the processor 204 (FIG. 2), the memory 206 (FIG. 2), and the DSP 220 (FIG. 2). In some implementations, means for generating can include the generating circuit.

The transmitting circuit can be configured to transmitting the allocation message. In some embodiments, the transmitting circuit can be configured to perform at least block 1230 of FIG. 12. The transmitting circuit can include one or more of the transmitter 214 (FIG. 2), the antenna 216 (FIG. 2), and the transceiver 214 (FIG. 2). In some implementations, means for transmitting can include the transmitting circuit.

In an embodiment, a STA 106 receiving the allocation message can be implemented in a wireless device that can include a receiving circuit, a determining circuit, and a decoding circuit. Those skilled in the art will appreciate that a wireless device can have more components than the simplified wireless device described herein. The wireless device described herein includes components useful for describing some features of implementations.

The receiving circuit can be configured to receive the allocation message and/or subsequent transmissions according to a selected allocation schema. The receiving circuit can include one or more of the receiver 212 (FIG. 2), the antenna 216 (FIG. 2), and the transceiver 214 (FIG. 2). In some implementations, means for receiving can include the receiving circuit.

The determining circuit can be configured to determine an AP-selected schema. The determining circuit can include one or more of the processor 204 (FIG. 2), the memory 206 (FIG. 2), and the DSP 220 (FIG. 2). In some implementations, means for determining can include the determining circuit.

The decoding circuit can be configured to decode the allocation message. The decoding circuit can include one or more of the processor 204 (FIG. 2), the memory 206 (FIG. 2), and the DSP 220 (FIG. 2). In some implementations, means for decoding can include the decoding circuit.

Implementing Technology

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

As used herein, a phrase referring to "at least one of" a list of items refers to any combination of those items, including single members. As a first example, "at least one of a and b" (also "a or b") is intended to cover a, b, and a-b, as well as any combination with multiples of the same element (e.g., a-a, a-a-a, a-a-b, a-b-b, b-b, b-b-b, or any other ordering of a and b). As a second example, "at least one of: a, b, and c" (also "a, b, or c") is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of communicating over a wireless communication network, the method comprising:
    selecting one of a plurality of allocation schemas for allocation of tone-blocks to wireless communication devices, the selected allocation schema comprising a plurality of allocations;
    generating an allocation message comprising an index identifying the selected allocation schema, the index being indicative of a number of one or more allocations of tone-blocks and a size of the tone-blocks for each of the plurality of allocations of the selected allocation schema, wherein each allocation of the plurality of allocations comprises an indication of the number of users sharing said each allocation, a station identifier for each user sharing said each allocation, and one or more user parameters for each user sharing said each allocation; and
    transmitting the allocation message to one or more wireless communication devices.

2. The method of claim 1, wherein each of the one or more allocations corresponds to a corresponding ordinal allocation in the selected allocation schema.

3. The method of claim 1, wherein the plurality of allocation schemas comprise 20 MHz schemas, 40 MHz schemas, and 80 MHz schemas, wherein at least one 40 MHz schema comprises a portion of a 20 MHz schema, wherein at least one 80 MHz scheme comprises a portion of a 20 MHz schema or a 40 MHz schema.

4. The method of claim 1, wherein the allocations each comprise an indication indicating whether or not more than one user shares the allocation.

5. The method of claim 4, wherein when the indication indicates that more than one user does not share the allocation, the allocation comprises a station identifier and one or more user parameters.

6. The method of claim 1, wherein the method is performed by an access point serving at least one mobile station, wherein a processor of the access point is configured to transmit the allocation message to the at least one mobile station through a transmitter and antenna of the access point.

7. The method of claim 1, wherein no more than 8 users share each allocation.

8. An apparatus configured to provide wireless communication, comprising:
    a memory that stores instructions;
    a processor coupled with the memory, wherein the processor and the memory are configured to:
    select one of a plurality of allocation schemas for allocation of tone-blocks to wireless communication devices, the selected allocation schema comprising a plurality of allocations;
    generate an allocation message comprising an index identifying the selected allocation schema, the index being indicative of a number of one or more allocations of tone-blocks and a size of the tone-blocks for each of the plurality of allocations of the selected allocation schema, wherein each allocation of the plurality of allocations comprises an indication of the number of users sharing said each allocation, a station identifier for each user sharing said each allocation, and one or more user parameters for each user sharing said each allocation; and
    a transmitter configured to transmit the allocation message to one or more wireless communication devices.

9. The apparatus of claim 8, wherein each of the one or more allocations corresponds to a corresponding ordinal allocation in the selected allocation schema.

10. The apparatus of claim 8, wherein the plurality of allocation schemas comprise 20 MHz schemas, 40 MHz schemas, and 80 MHz schemas, wherein at least one 40 MHz schema comprises a portion of a 20 MHz schema, wherein at least one 80 MHz scheme comprises a portion of a 20 MHz schema or a 40 MHz schema.

11. The apparatus of claim 8, wherein the allocations each comprise an indication indicating whether or not more than one user shares the allocation.

12. The apparatus of claim 11, wherein when the indication indicates that more than one user does not share the allocation, the allocation comprises a station identifier and one or more user parameters.

13. The apparatus of claim 8, wherein the apparatus comprises an access point serving at least one mobile station, wherein the processor and memory are configured to transmit the allocation message to the at least one mobile station through the transmitter and an antenna of the access point.

14. The apparatus of claim 8, wherein the transmitter is configured to transmit at least a portion of the allocation message using a 1× symbol duration of 3.2 milliseconds or a 4× symbol duration of 12.8 milliseconds.

15. An apparatus for wireless communication, comprising:
    means for selecting one of a plurality of allocation schemas for allocation of tone-blocks to wireless communication devices, the selected allocation schema comprising a plurality of allocations;
    means for generating an allocation message comprising an index identifying the selected allocation schema, the index being indicative of a number of one or more allocations of tone-blocks and a size of the tone-blocks for each of the plurality of allocations of the selected allocation schema, wherein each allocation of the plurality of allocations comprises an indication of the number of users sharing said each allocation, a station identifier for each user sharing said each allocation, and one or more user parameters for each user sharing said each allocation; and
    means for transmitting the allocation message to one or more wireless communication devices.

16. The apparatus of claim 15, wherein each of the one or more allocations corresponds to a corresponding ordinal allocation in the selected allocation schema.

17. The apparatus of claim 15, wherein the plurality of allocation schemas comprise 20 MHz schemas, 40 MHz schemas, and 80 MHz schemas, wherein at least one 40 MHz schema comprises a portion of a 20 MHz schema, wherein at least one 80 MHz scheme comprises a portion of a 20 MHz schema or a 40 MHz schema.

18. The apparatus of claim 15, wherein the allocations each comprise an indication indicating whether or not more than one user shares the allocation.

19. The apparatus of claim 18, wherein when the indication indicates that more than one user does not share the allocation, the allocation comprises a station identifier and one or more user parameters.

20. The apparatus of claim 15, wherein the apparatus comprises an access point serving at least one mobile station, wherein a processor of the access point is configured to transmit the allocation message to the at least one mobile station through a transmitter and antenna of the access point.

21. A non-transitory computer-readable medium comprising code that, when executed, causes an apparatus to:
- select one of a plurality of allocation schemas for allocation of tone-blocks to wireless communication devices, the selected allocation schema comprising a plurality of allocations;
- generate an allocation message comprising an index identifying the selected allocation schema, the index being indicative of a number of one or more allocations of tone-blocks and a size of the tone-blocks for each of the plurality of allocations of the selected allocation schema, wherein each allocation of the plurality of allocations comprises an indication of the number of users sharing said each allocation, a station identifier for each user sharing said each allocation, and one or more user parameters for each user sharing said each allocation; and
- transmit the allocation message to one or more wireless communication devices.

22. The medium of claim 21, wherein each of the one or more allocations corresponds to a corresponding ordinal allocation in the selected allocation schema.

23. The medium of claim 21, wherein the plurality of allocation schemas comprise 20 MHz schemas, 40 MHz schemas, and 80 MHz schemas, wherein at least one 40 MHz schema comprises a portion of a 20 MHz schema, wherein at least one 80 MHz scheme comprises a portion of a 20 MHz schema or a 40 MHz schema.

24. The medium of claim 21, wherein the allocations each comprise an indication indicating whether or not more than one user shares the allocation.

25. The medium of claim 24, wherein when the indication indicates that more than one user does not share the allocation, the allocation comprises a station identifier and one or more user parameters.

26. The medium of claim 21, wherein the apparatus comprises an access point serving at least one mobile station, wherein a processor of the access point is configured to transmit the allocation message to the at least one mobile station through a transmitter and antenna of the access point.

* * * * *